US012693891B2

(12) United States Patent (10) Patent No.: US 12,693,891 B2
Mills et al. (45) Date of Patent: Jul. 28, 2026

(54) TASK CONTEXT SWITCH FOR NEURAL PROCESSOR CIRCUIT

(71) Applicant: Apple Inc., Cupertino, CA (US)

(72) Inventors: Christopher L. Mills, Saratoga, CA (US); Kenneth W. Waters, San Jose, CA (US)

(73) Assignee: APPLE INC., Cupertino, CA (US)

( * ) Notice: Subject to any disclaimer, the term of this patent is extended or adjusted under 35 U.S.C. 154(b) by 28 days.

(21) Appl. No.: 19/001,159

(22) Filed: Dec. 24, 2024

(65) Prior Publication Data

US 2025/0165282 A1     May 22, 2025

Related U.S. Application Data

(63) Continuation of application No. 17/155,878, filed on Jan. 22, 2021, now Pat. No. 12,229,586.

(51) Int. Cl.
  G06F 9/48     (2006.01)
  *G06N 3/045*     (2023.01)
  *G06N 3/063*     (2023.01)
  *G06N 3/084*     (2023.01)

(52) U.S. Cl.
  CPC ............. G06F 9/485 (2013.01); *G06N 3/045* (2023.01); *G06N 3/063* (2013.01); *G06N 3/084* (2013.01)

(58) Field of Classification Search
  CPC ........ G06F 9/485; G06N 3/045; G06N 3/063; G06N 3/084; G06N 3/0464
  See application file for complete search history.

(56) References Cited

U.S. PATENT DOCUMENTS

| | | | |
|---|---|---|---|
| 8,037,281 B2 | 10/2011 | Kruger et al. | |
| 10,331,997 B2 * | 6/2019 | Bohn ....................... | G06N 3/04 |
| 2015/0170021 A1 * | 6/2015 | Lupon .................. | G06N 3/0464 |
| | | | 706/15 |
| 2019/0180183 A1 | 6/2019 | Diamant et al. | |
| 2020/0082273 A1 * | 3/2020 | Rossi ..................... | G06N 3/063 |

* cited by examiner

*Primary Examiner* — Xiao En Mo

(74) *Attorney, Agent, or Firm* — Sterne, Kessler, Goldstein & Fox P.L.L.C.

(57)     ABSTRACT

A neural processor includes neural engines for performing convolution operations on input data corresponding to one or more tasks to generate output data. The neural processor also includes a data processor circuit coupled to external system memory. The data processor circuit includes a buffer for storing the output data from the neural engines. The neural processor further includes a task manager coupled to the data processor circuit. The task manager receives a context-switch task. The context-switch task specifies a switch of the data processor circuit from handling an outgoing task to an incoming task. The task manager sends configuration data of the context-switch task to cause the data processor circuit to transmit the output data corresponding to the outgoing task from the buffer to the external system memory. The data processor circuit also fetches data corresponding to the incoming task from the external system memory to the buffer.

20 Claims, 15 Drawing Sheets

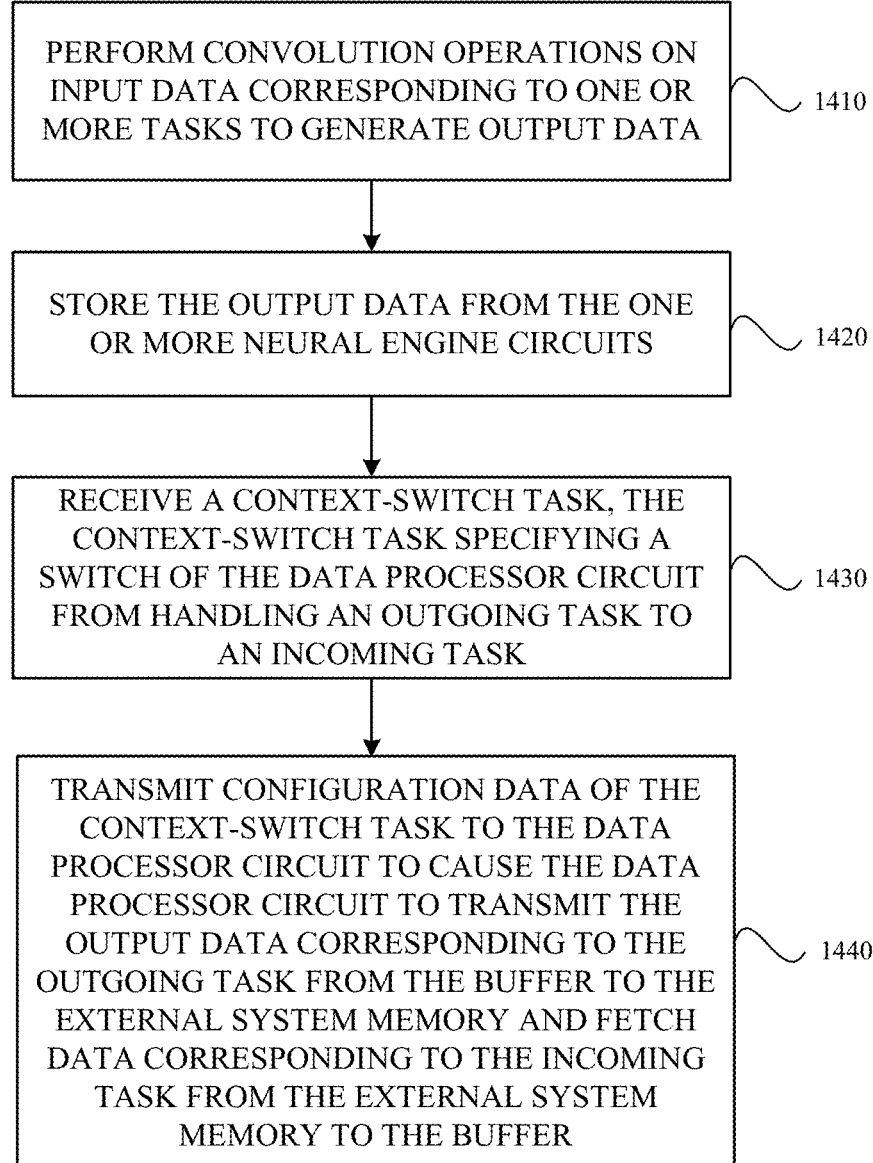

PERFORM CONVOLUTION OPERATIONS ON INPUT DATA CORRESPONDING TO ONE OR MORE TASKS TO GENERATE OUTPUT DATA — 1410

STORE THE OUTPUT DATA FROM THE ONE OR MORE NEURAL ENGINE CIRCUITS — 1420

RECEIVE A CONTEXT-SWITCH TASK, THE CONTEXT-SWITCH TASK SPECIFYING A SWITCH OF THE DATA PROCESSOR CIRCUIT FROM HANDLING AN OUTGOING TASK TO AN INCOMING TASK — 1430

TRANSMIT CONFIGURATION DATA OF THE CONTEXT-SWITCH TASK TO THE DATA PROCESSOR CIRCUIT TO CAUSE THE DATA PROCESSOR CIRCUIT TO TRANSMIT THE OUTPUT DATA CORRESPONDING TO THE OUTGOING TASK FROM THE BUFFER TO THE EXTERNAL SYSTEM MEMORY AND FETCH DATA CORRESPONDING TO THE INCOMING TASK FROM THE EXTERNAL SYSTEM MEMORY TO THE BUFFER — 1440

*FIG. 14*

TASK CONTEXT SWITCH FOR NEURAL PROCESSOR CIRCUIT

CROSS-REFERENCE TO RELATED APPLICATION

The application is a continuation and claims benefit of U.S. patent application Ser. No. 17/155,878, filed on Jan. 22, 2021, which is incorporated by reference herein in its entirety.

BACKGROUND

1. Field of the Disclosure

The present disclosure relates to a circuit for performing operations related to neural networks, and more specifically to operations related to context switch of tasks in neural processor circuits.

2. Description of the Related Arts

An artificial neural network (ANN) is a computing system or model that uses a collection of connected nodes to process input data. The ANN is typically organized into layers where different layers perform different types of transformation on their input. Extensions or variants of ANN such as convolution neural network (CNN), recurrent neural networks (RNN) and deep belief networks (DBN) have come to receive much attention. These computing systems or models often involve extensive computing operations including multiplication and accumulation. For example, CNN is a class of machine learning techniques that primarily uses convolution between input data and kernel data, which can be decomposed into multiplication and accumulation operations.

Depending on the types of input data and operations to be performed, these machine learning systems or models can be configured differently. Such varying configurations would include, for example, pre-processing operations, the number of channels in input data, kernel data to be used, non-linear function to be applied to convolution result, and applying of various post-processing operations. Using a central processing unit (CPU) and its main memory to instantiate and execute machine learning systems or models of various configurations is relatively easy because such systems or models can be instantiated with mere updates to code. However, relying solely on the CPU for various operations of these machine learning systems or models would consume significant bandwidth of a central processing unit (CPU) as well as increase the overall power consumption.

Electronic devices that are equipped with a neural processor specialized in performing computations related to machine learning models have become increasingly more common. Owing to the increased reliance on artificial intelligence in various software applications, an electronic device often operates multiple software applications that run one or more neural networks.

SUMMARY

Embodiments relate to a neural processor circuit including one or more neural engine circuits for performing convolution operations on input data corresponding to one or more tasks to generate output data. The neural processor circuit also includes a data processor circuit that is coupled to one or more neural engine circuits and coupled to an external system memory. The data processor circuit includes a buffer for storing the output data from the neural engine circuits. The neural processor circuit further includes a task manager circuit that is coupled to the data processor circuit. The task manager circuit receives a context-switch task. The context-switch task specifies a switch of the data processor circuit from handling an outgoing task to an incoming task. The task manager circuit sends configuration data of the context-switch task to the data processor circuit to cause the data processor circuit to transmit the output data corresponding to the outgoing task from the buffer to the external system memory. The configuration data also causes the data processor circuit to fetch data corresponding to the incoming task from the external system memory to the buffer.

BRIEF DESCRIPTION OF THE DRAWINGS

FIG. 14 is a flowchart illustrating an example process for performing neural processing operations with context switch, according to one embodiment.

Figure 1:
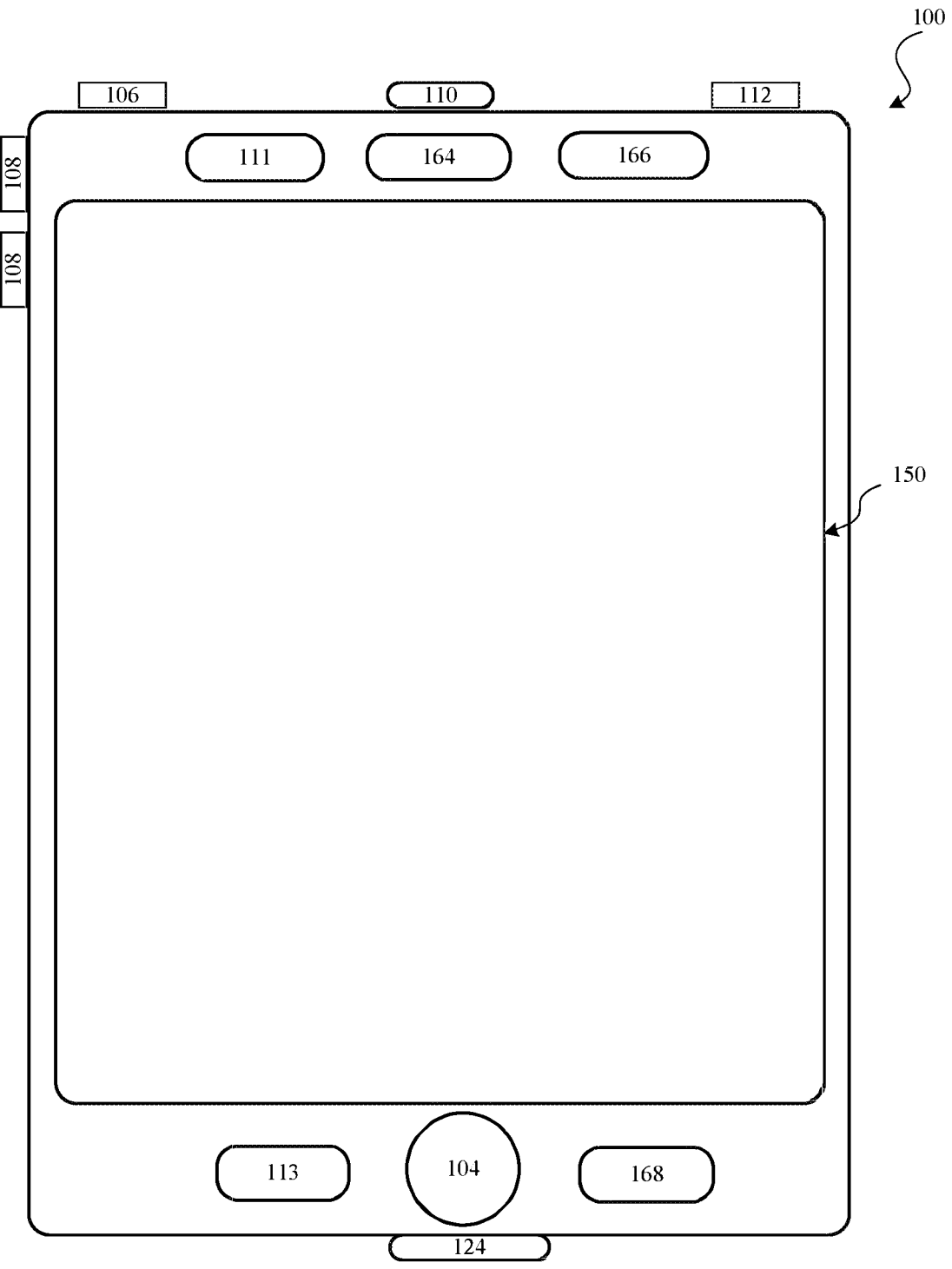
FIG. 1 is a high-level diagram of an electronic device, according to one embodiment

The figures depict, and the detailed description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to a neural processor that includes a data processor circuit that swaps in and out data stored in a buffer of the neural processor in an event of context switch from one task to another task. The neural processor may handle computations related to multiple neural networks. The intermediate outputs of those neural networks may be unrelated. In some cases, the neural processor may be requested to perform computations of two neural networks simultaneously, such as in an interleaved manner that switching between handling tasks of the two neural networks. A task manager circuit in the neural processor sends configuration data of a context-switch task to the data processor circuit. The data processor circuit transmits the output data corresponding to the outgoing task according to a first mask value from the buffer to a system memory external to the neural processor. The data processor also fetches data corresponding to the incoming task according to a second mask value from the system memory to the buffer.

Example Electronic Device

Embodiments of electronic devices, user interfaces for such devices, and associated processes for using such devices are described. In some embodiments, the device is a portable communications device, such as a mobile telephone, that also contains other functions, such as a personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, California. Other portable electronic devices, such as wearables, laptops or tablet computers, are optionally used. In some embodiments, the device is not a portable communication device, but is a desktop computer or other computing device that is not designed for portable use. In some embodiments, the disclosed electronic device may include a touch-sensitive surface (e.g., a touch screen display and/or a touchpad). An example electronic device described below in conjunction with Figure (FIG. 1 (e.g., device 100) may include a touch-sensitive surface for receiving user input. The electronic device may also include one or more other physical user-interface devices, such as a physical keyboard, a mouse and/or a joystick.

FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, headset jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed;

and/or to unlock the device or initiate an unlock process. In an alternative embodiment, device 100 also accepts verbal input for activation or deactivation of some functions through microphone 113. Device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. Device 100 may include more than one type of image sensors 164. Each type may include more than one image sensor 164. For example, one type of image sensors 164 may be cameras and another type of image sensors 164 may be infrared sensors for facial recognition that is performed by one or more machine learning models stored in device 100. Device 100 may include components not shown in FIG. 1 such as an ambient light sensor, a dot projector and a flood illuminator that is to support facial recognition.

Device 100 is only one example of an electronic device, and device 100 may have more or fewer components than listed above, some of which may be combined into a component or have a different configuration or arrangement. The various components of device 100 listed above are embodied in hardware, software, firmware or a combination thereof, including one or more signal processing and/or application-specific integrated circuits (ASICs).

Figure 2:
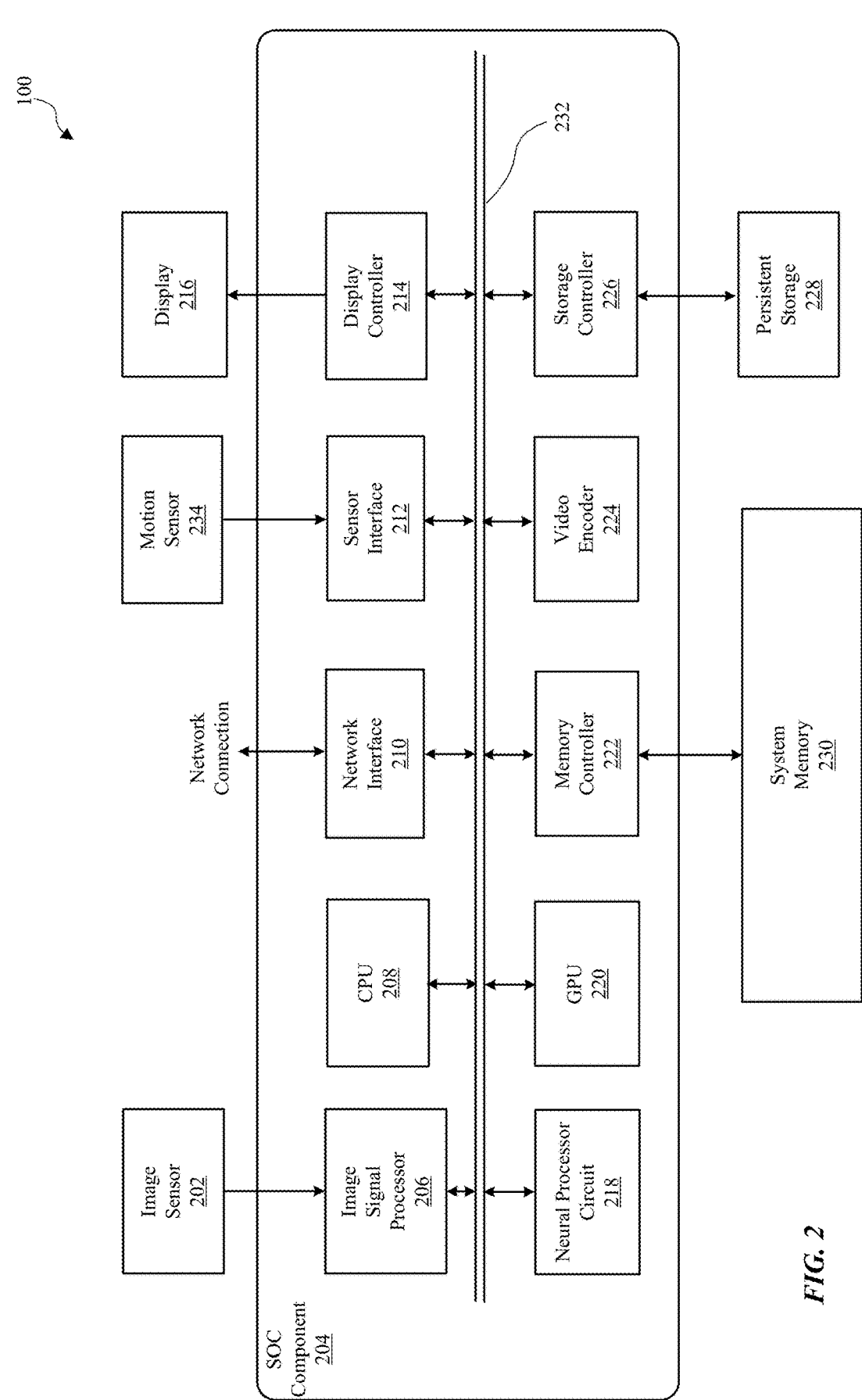
FIG. 2 is a block diagram illustrating components in the electronic device, according to one embodiment.

FIG. 2 is a block diagram illustrating components in device 100, according to one embodiment. Device 100 may perform various operations including implementing one or more machine learning models. For this and other purposes, device 100 may include, among other components, image sensors 202, a system-on-a chip (SOC) component 204, a system memory 230, a persistent storage (e.g., flash memory) 228, a motion sensor 234, and a display 216. The components as illustrated in FIG. 2 are merely illustrative. For example, device 100 may include other components (such as speaker or microphone) that are not illustrated in FIG. 2. Further, some components (such as motion sensor 234) may be omitted from device 100.

An image sensor 202 is a component for capturing image data and may be embodied, for example, as a complementary metal-oxide-semiconductor (CMOS) active-pixel sensor) a camera, video camera, or other devices. Image sensor 202 generates raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensor 202 may be in a Bayer color kernel array (CFA) pattern.

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light-emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof.

Persistent storage 228 is a component for storing data in a non-volatile manner. Persistent storage 228 retains data even when power is not available. Persistent storage 228 may be embodied as read-only memory (ROM), flash memory or other non-volatile random access memory devices. Persistent storage 228 stores an operating system of device 100 and various software applications. Persistent storage 228 may also store one or more machine learning models, such as regression models, random forest models, support vector machines (SVMs) such as kernel SVMs, and artificial neural networks (ANNs) such as convolutional network networks (CNNs), recurrent network networks (RNNs), autoencoders, and long short term memory (LSTM). A machine learning model may be an independent model that works with the neural processor circuit 218 and various software applications or sensors of device 100. A machine learning model may also be part of a software application. The machine learning models may perform various tasks such as facial recognition, image classification, object, concept, and information classification, speech recognition, machine translation, voice recognition, voice command recognition, text recognition, text and context analysis, other natural language processing, predictions, and recommendations.

Various machine learning models stored in device 100 may be fully trained, untrained, or partially trained to allow device 100 to reinforce or continue to train the machine learning models as device 100 is used. Operations of the machine learning models include various computations used in training the models and determining results in runtime using the models. For example, in one case, device 100 captures facial images of the user and uses the images to continue to improve a machine learning model that is used to lock or unlock the device 100.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, sensor interface 212, display controller 214, neural processor circuit 218, graphics processor (GPU) 220, memory controller 222, video encoder 224, storage controller 226, and bus 232 connecting these subcomponents. SOC component 204 may include more or fewer subcomponents than those shown in FIG. 2.

ISP 206 is a circuit that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

Neural processor circuit 218 is a circuit that performs various machine learning operations based on computation including multiplication, addition, and accumulation. Such computation may be arranged to perform, for example, various types of tensor multiplications such as tensor product and convolution of input data and kernel data. Neural processor circuit 218 is a configurable circuit that performs these operations in a fast and power-efficient manner while relieving CPU 208 of resource-intensive operations associated with neural network operations. Neural processor circuit 218 may receive the input data from sensor interface 212, the image signal processor 206, persistent storage 228, system memory 230 or other sources such as network interface 210 or GPU 220. The output of neural processor circuit 218 may be provided to various components of device 100 such as image signal processor 206, system memory 230 or CPU 208 for various operations. The structure and operation of neural processor circuit 218 are described below in detail with reference to FIG. 3.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206) and display. The networks may include, but are not limited to, Local Area Networks (LANs) (e.g., an Ethernet or corporate network) and Wide Area Networks (WANs). The image data received via network interface 210 may undergo image processing processes by ISP 206.

Sensor interface 212 is circuitry for interfacing with motion sensor 234. Sensor interface 212 receives sensor information from motion sensor 234 and processes the sensor information to determine the orientation or movement of device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 128 or for passing the data to network interface 210 for transmission over a network to another device.

In some embodiments, one or more subcomponents of SOC component 204 or some functionality of these subcomponents may be performed by software components executed on neural processor circuit 218, ISP 206, CPU 208 or GPU 220. Such software components may be stored in system memory 230, persistent storage 228 or another device communicating with device 100 via network interface 210.

Example Neural Processor Circuit

Neural processor circuit 218 is a programmable circuit that performs machine learning operations on the input data of neural processor circuit 218. Machine learning operations may include different computations for training of a machine learning model and for performing inference or prediction based on the trained machine learning model.

Taking an example of a CNN as the machine learning model, training of the CNN may include forward propagation and backpropagation. A neural network may include an input layer, an output layer, and one or more intermediate layers that may be referred to as hidden layers. Each layer may include one or more nodes, which may be fully or partially connected to other nodes in adjacent layers. In forward propagation, the neural network performs computation in the forward direction based on outputs of a preceding layer. The operation of a node may be defined by one or more functions. The functions that define the operation of a node may include various computational operations such as convolution of data with one or more kernels, pooling of layers, tensor multiplication, etc. The functions may also include an activation function that adjusts the weight of the output of the node. Nodes in different layers may be associated with different functions. For example, a CNN may include one or more convolutional layers that are mixed with pooling layers and are followed by one or more fully connected layers.

Each of the functions, including kernels, in a machine learning model may be associated with different coefficients that are adjustable during training. In addition, some of the nodes in a neural network each may also be associated with an activation function that decides the weight of the output of the node in a forward propagation. Common activation functions may include step functions, linear functions, sigmoid functions, hyperbolic tangent functions (tanh), and rectified linear unit functions (ReLU). After a batch of data of training samples passes through a neural network in the forward propagation, the results may be compared to the training labels of the training samples to compute the network's loss function, which represents the performance of the network. In turn, the neural network performs backpropagation by using coordinate descent such as stochastic coordinate descent (SGD) to adjust the coefficients in various functions to improve the value of the loss function.

In training, device 100 may use neural processor circuit 218 to perform all or some of the operations in the forward propagation and backpropagation. Multiple rounds of forward propagation and backpropagation may be performed by neural processor circuit 218, solely or in coordination with other processors such as CPU 208, GPU 220, and ISP 206. Training may be completed when the loss function no longer improves (e.g., the machine learning model has converged) or after a predetermined number of rounds for a particular set of training samples. As device 100 is used, device 100 may continue to collect additional training samples for the neural network.

For prediction or inference, device 100 may receive one or more input samples. Neural processor circuit 218 may take the input samples to perform forward propagation to determine one or more results. The input samples may be images, speeches, text files, sensor data, or other data.

Data and functions (e.g., input data, kernels, functions, layers outputs, gradient data) in machine learning may be saved and represented by one or more tensors. Common operations related to training and runtime of a machine learning model may include tensor product, tensor transpose, tensor elementwise operation, convolution, application of an activation function, automatic differentiation to determine gradient, statistics and aggregation of values in tensors (e.g., average, variance, standard deviation), tensor rank and size manipulation, etc.

While the training and runtime of a neural network are discussed as an example, the neural processor circuit 218 may also be used for the operations of other types of machine learning models, such as a kernel SVM. For simplicity, this disclosure may describe operations of neural networks, but the operations can also be used for other types of machine learning models.

Figure 3:
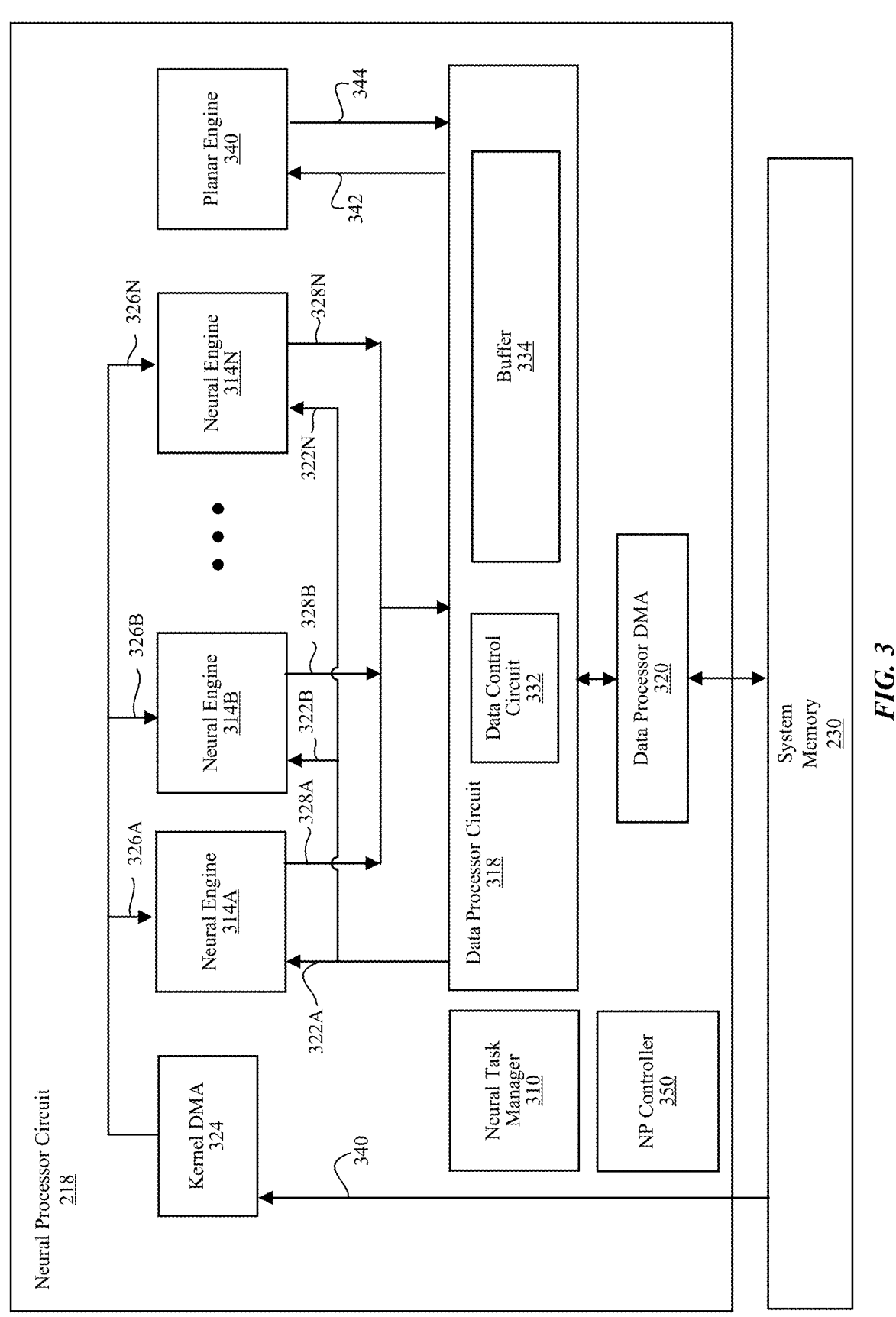
FIG. 3 is a block diagram illustrating a neural processor circuit, according to one embodiment.

Referring to FIG. 3, an example neural processor circuit 218 may include, among other components, neural task manager 310, a plurality of neural engines 314A through 314N (hereinafter collectively referred to as "neural engines 314" and individually also referred to as "neural engine 314"), kernel direct memory access (DMA) 324, data processor circuit 318, data processor DMA 320, planar engine 340, and neural processor (NP) controller 350. Neural processor circuit 218 may include fewer components than what are illustrated in FIG. 3 or include additional components not illustrated in FIG. 3.

Each of neural engines 314 performs computing operations for machine learning in parallel. Depending on the load of operation, the entire set of neural engines 314 may be operating or only a subset of the neural engines 314 may be operating while the remaining neural engines 314 are placed in a power-saving mode to conserve power. Each of neural engines 314 includes components for storing one or more kernels, for performing multiply-accumulate operations, and for post-processing to generate an output data 328, as described below in detail with reference to FIG. 4. Neural engines 314 may specialize in performing computation heavy operations such as convolution operations and tensor product operations. Convolution operations may include different kinds of convolutions, such as cross-channel convolutions (a convolution that accumulates values from different channels), channel-wise convolutions, and transposed convolutions.

Planar engine 340 may specialize in performing simpler computing operations whose speed may primarily depend on the input and output (I/O) speed of the data transmission instead of the computation speed within planar engine 340. These computing operations may be referred to as I/O bound computations and are also referred to as "non-convolution operations" herein. In contrast, neural engines 314 may focus on complex computation such as convolution operations whose speed may primarily depend on the computation speed within each neural engine 314. For example, planar engine 340 is efficient at performing operations within a single channel while neural engines 314 are efficient at performing operations across multiple channels that may involve heavy accumulation of data. The use of neural engine 314 to compute I/O bound computations may not be efficient in terms of both speed and power consumption. In one embodiment, input data may be a tensor whose rank is larger than three (e.g., having three or more dimensions). A set of dimensions (two or more) in the tensor may be referred to as a plane while another dimension may be referred to as a channel. Neural engines 314 may convolve data of a plane in the tensor with a kernel and accumulate results of the convolution of different planes across different channels. On the other hand, planar engine 340 may specialize in operations within the plane.

The circuitry of planar engine 340 may be programmed for operation in one of multiple modes, including a pooling mode, an elementwise mode, and a reduction mode. In the pooling mode, planar engine 340 reduces a spatial size of input data. In the elementwise mode, planar engine 340 generates an output that is derived from elementwise operations of one or more inputs. In the reduction mode, planar engine 340 reduces the rank of a tensor. For example, a rank 5 tensor may be reduced to a rank 2 tensor, or a rank 3 tensor may be reduced to a rank 0 tensor (e.g., a scalar). The operations of planar engine 340 will be discussed in further detail below with reference to FIG. 5.

Neural task manager 310 manages the overall operation of neural processor circuit 218. Neural task manager 310 may receive a task list from a compiler executed by CPU 208, store tasks in its task queues, choose a task to perform, and send task commands to other components of the neural processor circuit 218 for performing the chosen task. Data may be associated with a task command that indicates the types of operations to be performed on the data. Data of the neural processor circuit 218 includes input data that is transmitted from another source such as system memory 230, and data generated by the neural processor circuit 218 in a previous operation cycle. Each dataset may be associated with a task command that specifies the type of operations to be performed on the data. Neural task manager 310 may also perform switching of tasks on detection of events such as receiving instructions from CPU 208. In one or more embodiments, neural task manager 310 sends rasterizer information to the components of neural processor circuit 218 to enable each of the components to track, retrieve or process appropriate segments of the input data and kernel data. For example, neural task manager 310 may include registers that store the information regarding the size and rank of a dataset for processing by the neural processor circuit 218. Although neural task manager 310 is illustrated in FIG. 3 as part of neural processor circuit 218, neural task manager 310 may be a component outside the neural processor circuit 218.

Kernel DMA 324 is a read circuit that fetches kernel data from a source (e.g., system memory 230) and sends kernel data 326A through 326N to each of the neural engines 314. Kernel data represents information from which kernel elements can be extracted. In one embodiment, the kernel data may be in a compressed format which is decompressed at each of neural engines 314. Although kernel data provided to each of neural engines 314 may be the same in some instances, the kernel data provided to each of neural engines 314 is different in most instances. In one embodiment, the direct memory access nature of kernel DMA 324 may allow kernel DMA 324 to fetch and write data directly from the source without the involvement of CPU 208.

Data processor circuit 318 manages data traffic and task performance of neural processor circuit 218. Data processor circuit 318 may include a data control circuit 332 and a buffer 334. Buffer 334 is temporary storage for storing data associated with operations of neural processor circuit 218, such as input data that is transmitted from system memory 230 (e.g., data from a machine learning model) and other data that is generated within neural processor circuit 218. The input data may be transmitted from system memory 230. The data stored in data processor circuit 318 may include different subsets that are sent to various downstream components, such as neural engines 314 and planar engine 340.

In one embodiment, buffer 334 is embodied as a non-transitory memory that can be accessed by neural engines 314 and planar engine 340. Buffer 334 may store input data 322A through 322N (also referred to as "neural input data" herein) for feeding to corresponding neural engines 314A through 314N and input data 342 (also referred to as "planar input data" herein) for feeding to planar engine 340, as well as output data 328A through 328N from each of neural engines 314A through 314N (also referred to as "neural output data" herein) and output data 344 from planar engine 340 (also referred to as "planar output data" herein) for feeding back into one or more neural engines 314 or planar engine 340, or sending to a target circuit (e.g., system memory 230). Buffer 334 may also store input data 342 and output data 344 of planar engine 340 and allow the exchange of data between neural engine 314 and planar engine 340. For example, one or more output data 328A through 328N of neural engines 314 are used as planar input data 342 to planar engine 340. Likewise, planar output data 344 of planar engine 340 may be used as the input data 322A through 322N of neural engines 314. The inputs of neural engines 314 or planar engine 340 may be any data stored in buffer 334. For example, in various operating cycles, the source datasets from which one of the engines fetches as inputs may be different. The input of an engine may be an output of the same engine in previous cycles, outputs of different engines, or any other suitable source datasets stored in buffer 334. Also, a dataset in buffer 334 may be divided and sent to different engines for different operations in the next operating cycle. Two datasets in buffer 334 may also be joined for the next operation.

Data control circuit 332 of data processor circuit 318 may control the exchange of data between neural engines 314 and planar engine 340. The operations of data processor circuit 318 and other components of neural processor circuit 218 are coordinated so that the input data and intermediate data stored in data processor circuit 318 may be reused across multiple operations at neural engines 314 and planar engine 340, thereby reducing data transfer to and from system memory 230. Data control circuit 332 may perform one or more of the following operations: (i) monitor the size and rank of data (e.g. data may be one or more tensors) that are being processed by neural engines 314 and planar engine 340, (ii) determine which subsets of data are transmitted to neural engines 314 or to planar engine 340 based on the task commands associated with different subsets of data, (iii) determine the manner in which data is transmitted to neural engines 314 and planar engine 340 (e.g., the data processor circuit 318 may operate in a broadcast mode where the same data is fed to multiple input channels of neural engines 314 so that multiple or all neural engines 314 receive the same data or in a unicast mode where different neural engines 314 receives different data), and (iv) transmit a configuration command to the planar engine 340 to direct planar engine 340 to program itself for operating in one of multiple operation modes. Details of data control circuit 332 are described below in detail with reference to FIG. 9.

The data of neural processor circuit 218 stored in buffer 334 may be part of, among others, image data, histogram of oriented gradients (HOG) data, audio data, metadata, output data 328 of a previous cycle of a neural engine 314, and other processed data received from other components of the SOC component 204.

Data processor DMA 320 includes a read circuit that receives a portion of the input data from a source (e.g., system memory 230) for storing in buffer 334, and a write circuit that forwards data from buffer 334 to a target component (e.g., system memory). In one embodiment, the direct memory access nature of data processor DMA 320 may allow data processor DMA 320 to fetch and write data directly from a source (e.g., system memory 230) without the involvement of CPU 208. Buffer 334 may be a direct memory access buffer that stores data of a machine learning model of device 100 without the involvement of CPU 208.

Neural Processor (NP) controller 350 is a control circuit that performs various operations to control the overall operation of neural processor circuit 218. NP controller 350 may interface with CPU 208, program components of neural processor circuit 218 by setting register in the components and perform housekeeping operations. NP controller 350 may also initialize components in neural processor circuit 218 when neural processor circuit 218 is turned on.

Example Neural Engine Architecture

Figure 4:
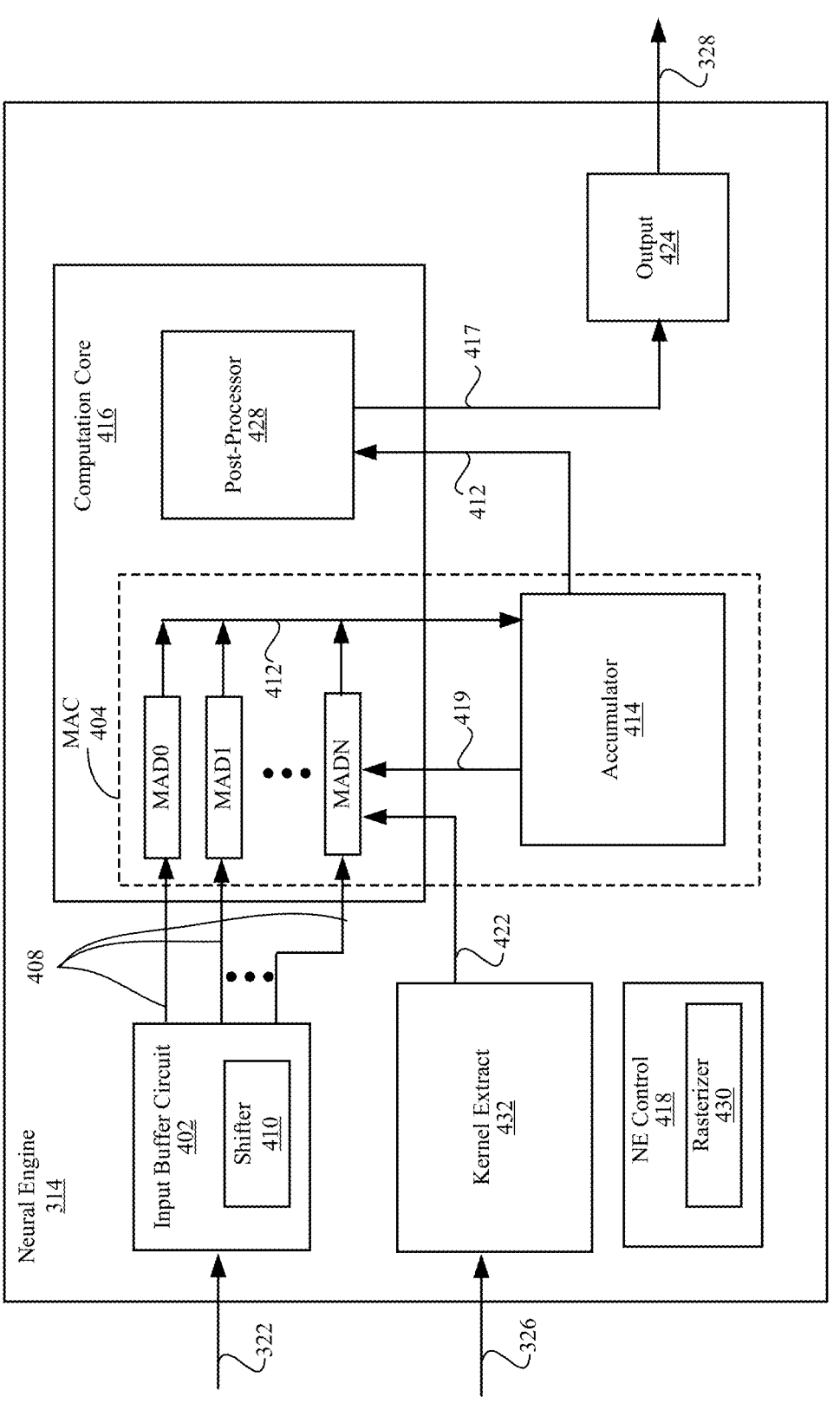
FIG. 4 is a block diagram of a neural engine in the neural processor circuit, according to one embodiment.

FIG. 4 is a block diagram of neural engine 314, according to one embodiment. Neural engine 314 is a circuit that performs various operations to facilitate machine learning such as convolution, tensor product, and other operations may involve heavy computation. For this purpose, neural engine 314 receives input data 322, performs multiply-accumulate operations (e.g., convolution operations) on input data 322 based on stored kernel data, performs further post-processing operations on the result of the multiply-accumulate operations, and generates output data 328. Input data 322 and/or output data 328 of neural engine 314 may be of a single channel or span across multiple channels.

Neural engine 314 may include, among other components, input buffer circuit 402, computation core 416, neural engine (NE) control 418, kernel extract circuit 432, accumulator 414 and output circuit 424. Neural engine 314 may include fewer components than what is illustrated in FIG. 4 or include further components not illustrated in FIG. 4.

Input buffer circuit 402 is a circuit that stores a subset of the data of neural processor circuit 218 as the subset of data is received from a source. The source may be data processor circuit 318, planar engine 340, or another suitable component. Input buffer circuit 402 sends an appropriate portion 408 of data for a current task or process loop to computation core 416 for processing. Input buffer circuit 402 may include a shifter 410 that shifts read locations of input buffer circuit 402 to change portion 408 of data sent to computation core 416. By changing portions of input data provided to computation core 416 via shifting, neural engine 314 can perform multiply-accumulate for different portions of input data based on a fewer number of read operations. In one or more embodiments, the data of neural processor circuit 218 includes data of difference convolution groups and/or input channels.

Kernel extract circuit 432 is a circuit that receives kernel data 326 from kernel DMA 324 and extracts kernel coefficients 422. In one embodiment, kernel extract circuit 432 references a lookup table (LUT) and uses a mask to reconstruct a kernel from compressed kernel data 326 based on the LUT. The mask indicates locations in the reconstructed kernel to be padded with zero and the remaining locations to be filled with numbers. Kernel coefficients 422 of the reconstructed kernel are sent to computation core 416 to populate register in multiply-add (MAD) circuits of computation core 416. In other embodiments, kernel extract circuit 432 receives kernel data in an uncompressed format and the kernel coefficients are determined without referencing a LUT or using a mask.

Computation core 416 is a programmable circuit that performs computation operations. For this purpose, computation core 416 may include MAD circuits MAD0 through MADN and a post-processor 428. Each of MAD circuits MAD0 through MADN may store an input value in the portion 408 of the input data and a corresponding kernel coefficient in kernel coefficients 422. The input value and the corresponding kernel coefficient are multiplied in each of MAD circuits to generate a processed value 412.

Accumulator 414 is a memory circuit that receives and stores processed values 412 from MAD circuits. The processed values stored in accumulator 414 may be sent back as feedback information 419 for further multiply and add operations at MAD circuits or sent to post-processor 428 for post-processing. Accumulator 414 in combination with MAD circuits form a multiply-accumulator (MAC) 404. In one or more embodiments, accumulator 414 may have subunits where each subunit sends data to different components of neural engine 314. For example, during a processing cycle, data stored in a first subunit of accumulator 414 is sent to the MAC circuit while data stored in a second subunit of accumulator 414 is sent to post-processor 428.

Post-processor 428 is a circuit that performs further processing of values 412 received from accumulator 414. Post-processor 428 may perform operations including, but not limited to, applying linear functions (e.g., Rectified Linear Unit (ReLU)), normalized cross-correlation (NCC), merging the results of performing neural operations on 8-bit data into 16-bit data, and local response normalization (LRN). The result of such operations is output from post-processor 428 as processed values 417 to output circuit 424. In some embodiments, the processing at the post-processor 428 is bypassed. For example, the data in accumulator 414 may be sent directly to output circuit 424 for access by other components of neural processor circuit 218.

NE control 418 controls operations of other components of neural engine 314 based on the operation modes and parameters of neural processor circuit 218. Depending on different modes of operation (e.g., group convolution mode or non-group convolution mode) or parameters (e.g., the number of input channels and the number of output channels), neural engine 314 may operate on different input data in different sequences, return different values from accumulator 414 to MAD circuits, and perform different types of post-processing operations at post-processor 428. To configure components of neural engine 314 to operate in a desired manner, the NE control 418 sends task commands that may be included in information 419 to components of neural engine 314. NE control 418 may include a rasterizer 430 that tracks the current task or process loop being processed at neural engine 314.

Input data is typically split into smaller pieces of data for parallel processing at multiple neural engines 314 or neural engines 314 and planar engine 340. A set of data used for a convolution operation may be referred to as a convolution group, which can be split into multiple smaller units. The hierarchy of smaller units (portions of data) may be convolution groups, slices, tiles, work units, output channel groups, input channels (Cin), sub-Cins for input stride, etc. For example, a convolution group may be split into several slices; a slice may be split into several tiles; a tile may be split into several work units; and so forth. In the context of neural engine 314, a work unit may be a portion of the input data, such as data processed by planar engine 340 or data processed a prior cycle of neural engines 314 having a size that produces output values that fit into accumulator 414 of neural engine 314 during a single cycle of the computation core 416. In one case, the size of each work unit is 256 bytes. In such embodiments, for example, work units can be shaped to one of 16×16, 32×8, 64×4, 128×2 or 256×1 datasets. In the context of planar engine 340, a work unit may be (i) a portion of input data, (ii) data from neural engine 314 or (iii) data from a prior cycle of planar engine 340 that can be processed simultaneously at planar engine 340.

Rasterizer 430 may perform the operations associated with dividing the input data into smaller units (portions) and regulate the processing of the smaller units through the MACs 404 and accumulator 414. Rasterizer 430 keeps track of sizes and ranks of portions of the input/output data (e.g., groups, work units, input channels, output channels) and instructs the components of a neural processor circuit 218 for proper handling of the portions of the input data. For example, rasterizer 430 operates shifters 410 in input buffer circuits 402 to forward correct portions 408 of input data to MAC 404 and send the finished output data 328 to data buffer 334. Other components of neural processor circuit 218 (e.g., kernel DMA 324, data processor DMA 320, data buffer 334, planar engine 340) may also have their corresponding rasterizers to monitor the division of input data and the parallel computation of various portions of input data in different components.

Output circuit 424 receives processed values 417 from post-processor 428 and interfaces with data processor circuit 318 to store processed values 417 in data processor circuit 318. For this purpose, output circuit 424 may send out as output data 328 in a sequence or a format that is different from the sequence or format in which the processed values 417 are processed in post-processor 428.

The components in neural engine 314 may be configured during a configuration period by NE control 418 and neural task manager 310. For this purpose, neural task manager 310 sends configuration information to neural engine 314 during the configuration period. The configurable parameters and modes may include, but are not limited to, mapping between input data elements and kernel elements, the number of input channels, the number of output channels, performing of output strides, and enabling/selection of post-processing operations at post-processor 428.

Example Planar Engine Architecture

Figure 5:
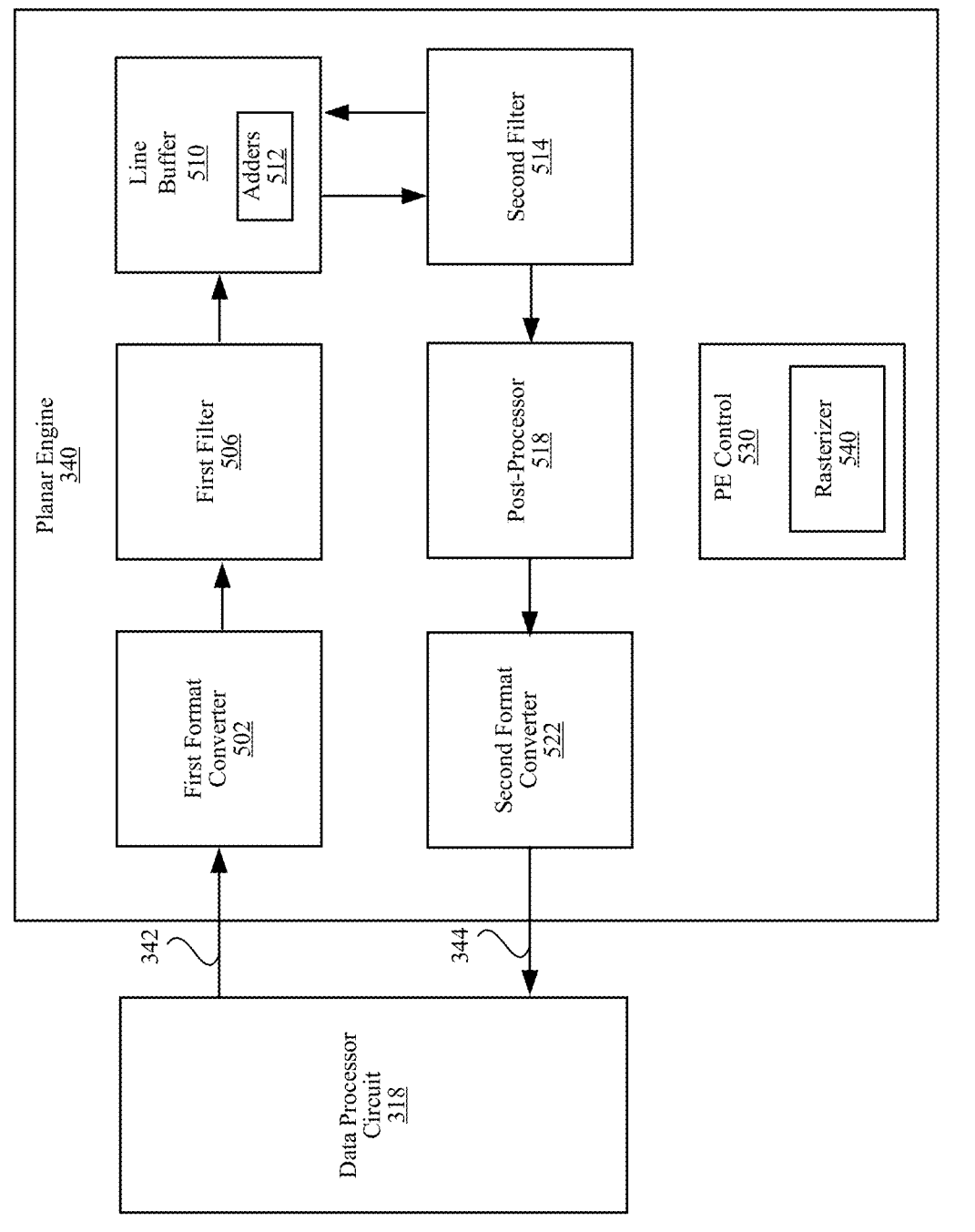
FIG. 5 is a block diagram of a planar engine in the neural processor circuit, according to one embodiment.

FIG. 5 is a block diagram of planar engine 340, according to one embodiment. Planar engine 340 is a circuit that is separated from neural engines 314 and can be programmed to perform in different modes of operations. For example, planar engine 340 may operate in a pooling mode that reduces the spatial size of data, in a reduction mode that reduces the rank of a tensor, in a gain-and-bias mode that provides a single-pass addition of bias and scaling by a scale factor, and in an elementwise mode that includes elementwise operations. For this purpose, planar engine 340 may include, among other components, a first format converter 502, a first filter 506 (also referred to herein as "multi-mode horizontal filter 506"), a line buffer 510, a second filter 514 (also referred to herein as "multi-mode vertical filter 514"), a post-processor 518, a second format converter 522, and a planar engine (PE) control 530 (includes rasterizer 540). Planar engine 340 may include fewer components or further components not illustrated in FIG. 5A. Each component in planar engine 340 may be embodied as a circuit or a circuit in combination with firmware or software.

Input data 342 of planar engine 340 may be fetched from one or more source datasets that are saved in data processor circuit 318. If a dataset to be processed by planar engine 340 is larger than a work unit of data that can be simultaneously processed by planar engine 340, such dataset may be segmented into multiple work units for reading as input data 342 to planar engine 340. Depending on the mode of planar engine 340, input data 342 may include data from one or more source datasets. The source dataset described herein refers to different data saved in neural processor circuit 218 for processing. Different components of neural processor circuit 218 may generate or transmit data that is saved in data processor circuit 318. For example, neural engines 314, planar engine 340 (which generated data in a previous operation cycle), and system memory 230 may generate or transmit different datasets that are saved in different memory locations of data processor circuit 318. Various source datasets may represent different tensors. In an operation cycle of planar engine 340, different source datasets may be fetched together as input data 342. For example, in an elementwise mode that involves the addition of two different tensors to derive a resultant tensor, the input data 342 may include data from two different source datasets, each providing a separate tensor. In other modes, a single source dataset may provide input data 342. For example, in a pooling mode, input data 342 may be fetched from a single source dataset.

First format converter 502 is a circuit that performs one or more format conversions on input data 342 in one format (e.g., a format used for storing in buffer 334) to another format for processing in subsequent components of planar engine 340. Such format conversions may include, among others, the following: applying a ReLU function to one or more values of input data 342, converting one or more values of input data 342 to their absolute values, transposing a tensor included in the sources, applying gain to one or more values of input data 342, biasing one or more values of input data 342, normalizing or de-normalizing one or more values of input data 342, converting floating-point numbers to signed or unsigned numbers (or vice versa), quantizing numbers, and changing the size of a tensor such as by broadcasting a value of a tensor in one or more dimensions to expand the rank of the tensor. The converted input data 342 and unconverted input data 342 to planar engine 340 are collectively referred to herein as "a version of the input data."

First filter 506 is a circuit that performs a filtering operation in one direction. For this purpose, first filter 506 may include, among other components, adders, comparators, and multipliers. The filtering performed by first filter 506 may be, for example, averaging, choosing a maximum value or choosing a minimum value. When averaging, adders are used to sum the values of input data 342 and a weighting factor may be applied to the sum using a multiplier to obtain the average as the resultant values. When selecting maximum and minimum values, the comparators may be used in place of the adders and the multipliers to select the values.

Line buffer 510 is a memory circuit for storing the result such as one or more intermediate data obtained from first filter 506 or second filter 514. Line buffer 510 may store values of different lines and allows access from second filter 514 or other downstream components to fetch the intermediate data for further processing. In some modes, line buffer 510 is bypassed. Line buffer 510 may also include logic circuits to perform additional operations other than merely storing the intermediate data. For example, line buffer 510 includes adder circuits 512, which in combination with memory component, enables line buffer 510 to function as an accumulator that aggregates data generated from the results of first filter 506 or second filter 514 to separately store aggregated data of a dimension not to be reduced.

Similar to first filter 506, second filter 514 performs filtering operations but in a direction different from first filter 506. For this purpose, second filter 514 may include, among other components, adders, comparators, and multipliers. In the pooling mode, first filter 506 performs filtering operation in a first dimension, while second filter 514 performs filtering operation in a second dimension. In other modes, first filter 506 and second filter 514 may operate differently. In a reduction mode, for example, first filter 506 performs elementwise operations while second filter 514 functions as a reduction tree to aggregate values of data.

Post-processor 518 is a circuit that performs further processing of values fetched from other upstream components. Post-processor 518 may include specialized circuits that are efficient at performing certain types of mathematical computations that might be inefficient to perform using a general computation circuit. Operations performed by post-processor 518 may include, among others, performing square root operations and inverse of values in a reduction mode. Post-processor 518 may be bypassed in other operation modes.

Second format converter 522 is a circuit that converts the results of preceding components in planar engine 340 from one format to another format for output data 344. Such format conversions may include, among others, the following: applying a ReLU function to the results, transposing a resultant tensor, normalizing or de-normalizing one or more values of the results, and other number format conversions. Output data 344 may be stored in data processor circuit 318 as the output of neural processor circuit 218 or as inputs to other components of neural processor circuit 218 (e.g., neural engine 314).

PE control 530 is a circuit that controls operations of other components in planar engine 340 based on the operation mode of planar engine 340. Depending on the different modes of operation, PE control 530 programs register associated with the different components in planar engine 340 so that the programmed components operate in a certain manner. The pipeline of components or connections between the components in planar engine 340 may also be reconfigured. In the pooling mode, for example, data processed by first filter 506 may be stored in line buffer 510 and then be read by second filter 514 for further filtering. In the reduction mode, however, data is processed by first filter 506, then processed at second filter 514 and then accumulated in line buffer 510 that is programmed as an accumulator. In the elementwise mode, line buffer 510 may be bypassed.

PE control 530 also includes a rasterizer 540 that tracks the current task or process loop being processed at planar engine 340. Rasterizer 540 is a circuit that tracks units or portions of input data and/or loops for processing the input data in planar engine 340. Rasterizer 540 may control the fetch of portions to planar engine 340 in each operation cycle and may monitor the size and rank of each portion being processed by planar engine 340. For example, smaller portions of a dataset may be fetched as input data 342 in a raster order for processing at planar engine 340 until all portions of the source dataset are processed. In fetching the portions, rasterizer 540 monitors the coordinate of the portion in the dataset. The manner in which a dataset is segmented into input data 342 for processing at planar engine 340 may be different compared to how a dataset is segmented into input data 328 for processing at neural engines 314.

The dataset for processing at planar engine 340 may be larger than the capacity of planar engine 340 that can be processed in a single operation cycle. In such a case, planar engine 340 fetches different portions of the dataset as input data 342 in multiple operating cycles. The fetched portion may partly overlap with a previously fetched portion and/or the next portion to be fetched. In one embodiment, the portion of overlapping data is fetched only once and reused to reduce the time and power consumption cost of planar engine 340 in fetching data.

Example Neural Task Manager and Task List Compilation

Figure 6:
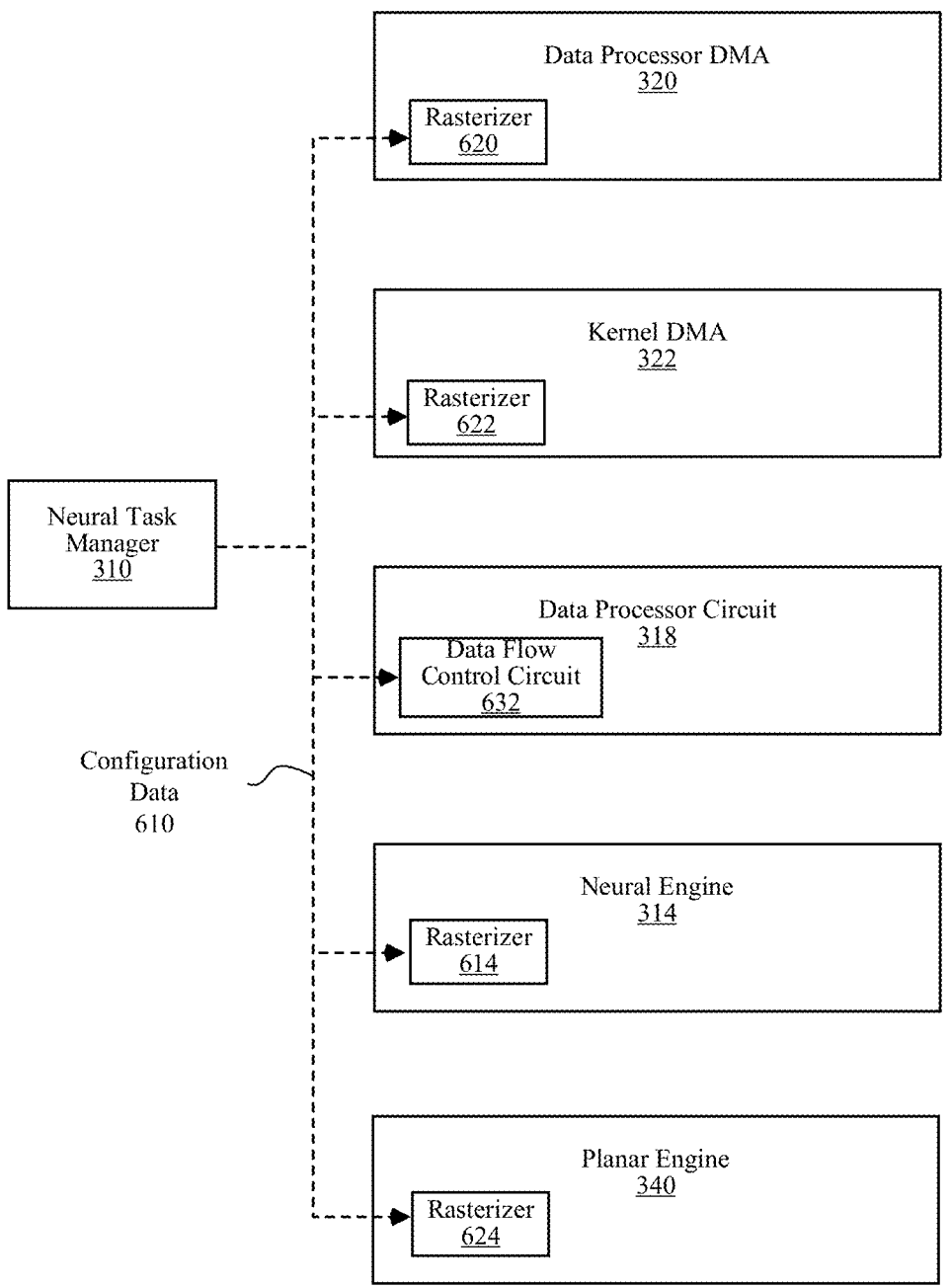
FIG. 6 is a diagram illustrating programming of rasterizers and a data flow control circuit to configure components of the neural processor circuit, according to one embodiment.

FIG. 6 is a diagram illustrating programming of rasterizers 614, 622, 624 and data control circuit 332 in components 314, 318, 322, 340 of the neural processor circuit 218, according to one embodiment. To perform their functions, rasterizers 614, 622, 624 and data control circuit 332 receive configuration data 610 indicating how the input data and/or kernel data are to be segmented and to be handled by each component of the neural processor circuit 218. The task information includes information about particulars of the current layer (e.g., dimensions of input and output data, the dimension of an associated kernel, types of padding at the boundaries of input data). Rasterizers 614, 622, 624 and data control circuit 332 may also receive constraints on their operations (e.g., whether to allow or disallow tile width over a threshold). Configuration data 610 sent to data control circuit 332 may further include information about data dependency and data hazards so that the data control circuit 332 may coordinate reading of input data to neural engines 314 and planar engine 340 from the data processor circuit 318 and the writing of output data of neural engines 314 and planar engine 340 to the data processor circuit 318.

By providing rasterizers in different components of neural processor circuit 218, overhead in data transmitted between the components of the neural processor circuit 218 may be reduced. If a single central rasterizer is provided to control different components of the neural processor circuit 218, kernel data, input data, and output data transmitted between the components may be needed in these data to identify associated position in the loops of the task such as convolution group, tile, slice, work unit, input channel and output channel. By using distributed rasterizers, no separate metadata is needed to transmit the kernel data, input data and output data among components of the neural processor circuit 218.

Figure 7:
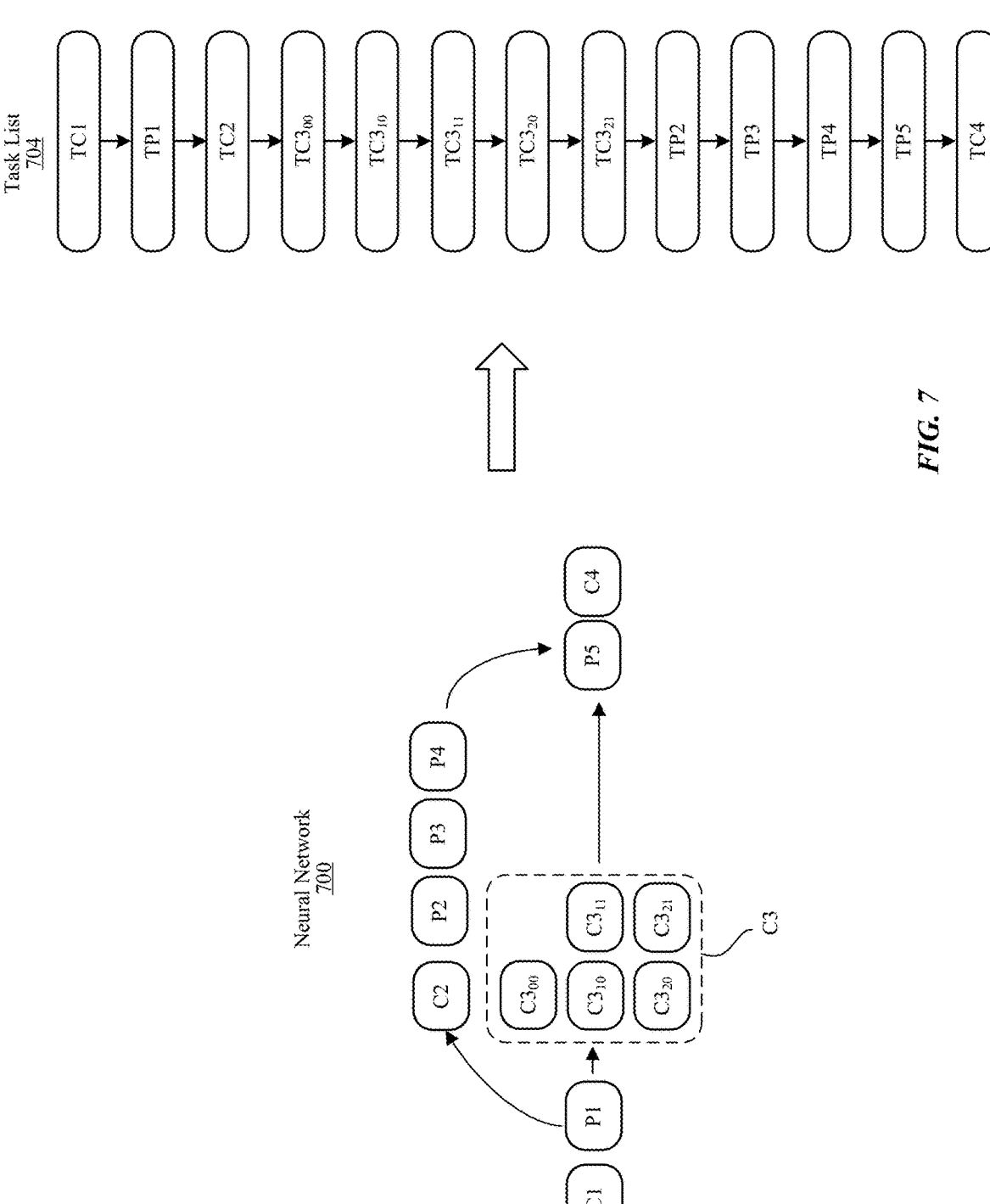
FIG. 7 is a schematic block diagram illustrating a neural network represented by a list of tasks, according to one embodiment.

A neural network may include network layers or sub-layers that are instantiated or implemented as a series of tasks executed by the neural processor circuit 218. FIG. 7 is a schematic block diagram illustrating a neural network 700 represented by a list 704 of tasks, according to one embodiment. The neural network 700 includes network layers (or sub-layers) including convolution layers C1, C2, C3 (including sub-layers $C3_{00}$, $C3_{10}$, $C3_{11}$, $C3_{20}$, and $C3_{21}$), C4, and non-convolution layers (e.g., pooling layers) P1, P2, P3 and P4. The neural network 700 is an example of a neural network architecture that may be instantiated by the neural processor circuit 218. That is, when tasks in the neural network 700 are converted into the task list 704 to become executable by the neural processor circuit 218. Other types of neural network architectures with different types of network layers or orders of network layers may also be instantiated by the neural processor circuit 218.

Neural network 700 is converted into task list 704 through a compiler process executed, for example, by CPU 208. Task list 704 includes a sequence of tasks including neural engine tasks TC1 through TC4 (corresponding to convolution layers C1 through C4) and planar engine tasks TP1 through TP5 (corresponding to pooling layers P1 through P5). Neural engine task TC3 is divided up into smaller neural engine tasks $TC3_{00}$ through $TC3_{21}$ (corresponding to sub-layers $C3_{00}$ through $C3_{21}$). In some embodiments, task list 704 is saved in a linked list format. In other embodiments, task list 704 are saved as one or more segments. Each segment may be stored in a contiguous region of memory that contains one or more tasks to be executed. Detailed structure and configuration of a segment is further discussed with reference to FIG. 11A. Although the example task list 704 shown in FIG. 7 is illustrated as a linear linked chain of tasks, the neural engine tasks and the planar engine tasks need not be performed in this sequence. Rather, in order to increase the efficiency of neural processor circuit 218, it is desirable to perform planar engine tasks in parallel with neural engine tasks as long as data dependency and data hazards issues are addressed. In one or more embodiments, the sequence of tasks among the neural engine tasks and the sequence of tasks among the planar engine tasks as determined during the compiler process are maintained, but the sequence between a planar engine task and a neural engine task can be switched.

Each task is associated with a task descriptor that defines a configuration of neural processor circuit 218 to execute the task. Each task may correspond with a single network layer of the neural network 700, a portion of a network layer of the neural network 700, or multiple network layers of the neural network 700. The neural processor circuit 218 instantiates neural network 700 by executing the tasks of task list 704 under the control of neural task manager 310.

Asynchronous Execution of Neural Engine Tasks and Planar Engine Tasks

Figure 8:
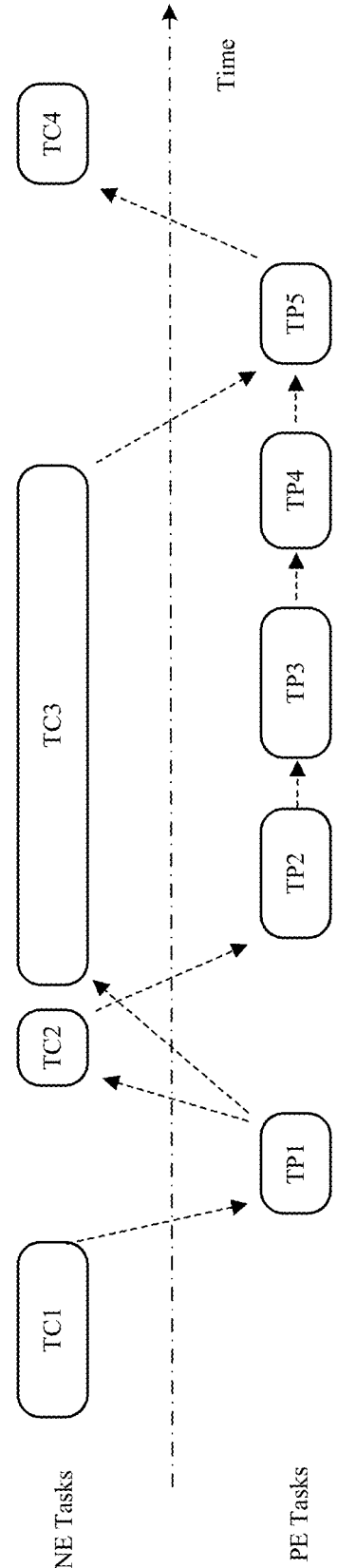
FIG. 8 is a timing diagram illustrating execution of tasks in the neural processor circuit, according to one embodiment.

FIG. 8 is a timing diagram illustrating execution of tasks in neural processor circuit 218, according to one embodiment. In this example, the tasks are started in the sequence of TC1, TP1, TC2, TC3, TP2, TP3, TP4, TP5 and TC4. Such sequence does not coincide with the sequence of tasks in task list 704 of FIG. 7. Because task TC3 is a long neural engine task and planar engine 340 can perform operations in parallel with neural engines 314, planar engine tasks TP2 through TP4 are performed while neural engine task TC3 is being performed. By processing tasks TP2 through TP4 in parallel with task TC3, the data for task TP5 is made available faster than performing the process in the sequence of task list 704.

Although FIG. 8 illustrates adjacent neural engine tasks and adjacent planar engine tasks as being separated by a time difference to facilitate the explanation, in practice, the times at which adjacent neural engine tasks and adjacent planar engine tasks are performed may overlap. Neural engines 314 and planar engine 340 may adopt pipelined processing architecture where they can receive input data for one task while producing output data for a previous task, neural engines 314 and planar engine 340 may operate on data on different tasks at the same time. For example, neural engine 314 may start on task TC3 before task TC2 is finished, and planar engine 340 may start on task TP3 before task TP2 is finished.

Figure 9:
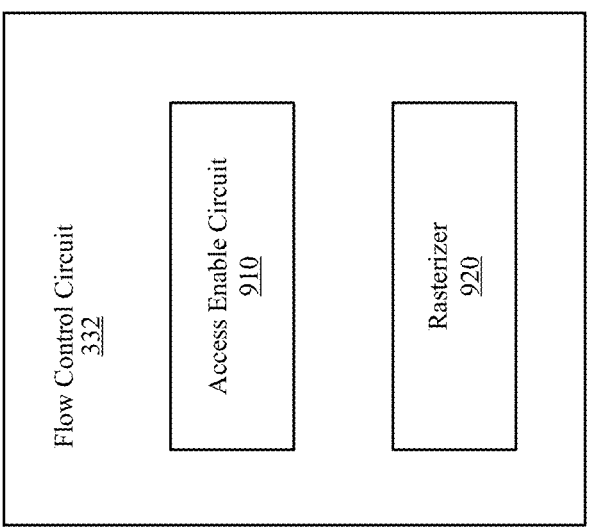
FIG. 9 is a block diagram of a data control circuit in a data processor circuit, according to one embodiment.

To address the data dependency issue, data control circuit 332 controls times at which neural input data and planar input data are sent to neural engines 314 and planar engine 340, respectively. For this purpose, data control circuit 332 may include, among other components, access enable circuit 910, rasterizer 920, as illustrated in FIG. 9. Data control circuit 332 may include other components not illustrated in FIG. 9.

Access enable circuit 910 is a programmable circuit that selectively grants access to read data from or write data to buffer 334 of data processor circuit 318. Neural engines 314 and planar engine 340 may be structured so that their circuits and components do not produce output data until input data is provided. Hence, access enable circuit 910 may cause the neural engines 314 or planar engine 340 to hold off its pending task by preventing neural engines 314 or planar engine 340 from accessing input data in the buffer 334 until all dependent data for the pending task is available in buffer 334. Access enable circuit 910 may determine the data dependency for a task by reading and analyzing dependency information included in a task information entry corresponding to the task, and determine whether all the dependent data is available in buffer 334 by referencing the status of tasks tracked by rasterizer 920. In this way, access enable circuit 910 may prevent starting of a next task dependent on output data of a previous task until the output data of the previous task is stored and available in buffer 334.

Access enable circuit 910 may also prevent writing of output data (generated by neural engines 314 and planar engine 340) to buffer 334 or reading of input data to address data hazards issues. For this purpose, access enable circuit 910 may reference the status of operations as indicated by rasterizer 920. Based on the indicated stats, access enable circuit 910 may prevent neural engines 314 or planar engine 340 from writing output data to buffer 334 until another operation or task is finished or prevent neural engines 314 or planar engine 340 from reading input data from buffer 334 for a current task until at least a portion of output data from a prior task is stored in buffer 334. Access enable circuit 910 may also perform other arbitration between any neural engines 314 and planar engine 340 for the access to the buffer 334.

Rasterizer 920 is a circuit that tracks the current size of data for each task or process loop being processed at data processor circuit 318. The function and operations of rasterizer 920 are substantially the same as rasterizers explained above in detail with reference to FIGS. 4 and 6. In one or more embodiments, at a given time, raster 920 may track a task that is different from tasks that other rasterizers (e.g., rasterizer 620 and rasterizer 622) are tracking.

Example Task Management

Figure 10:
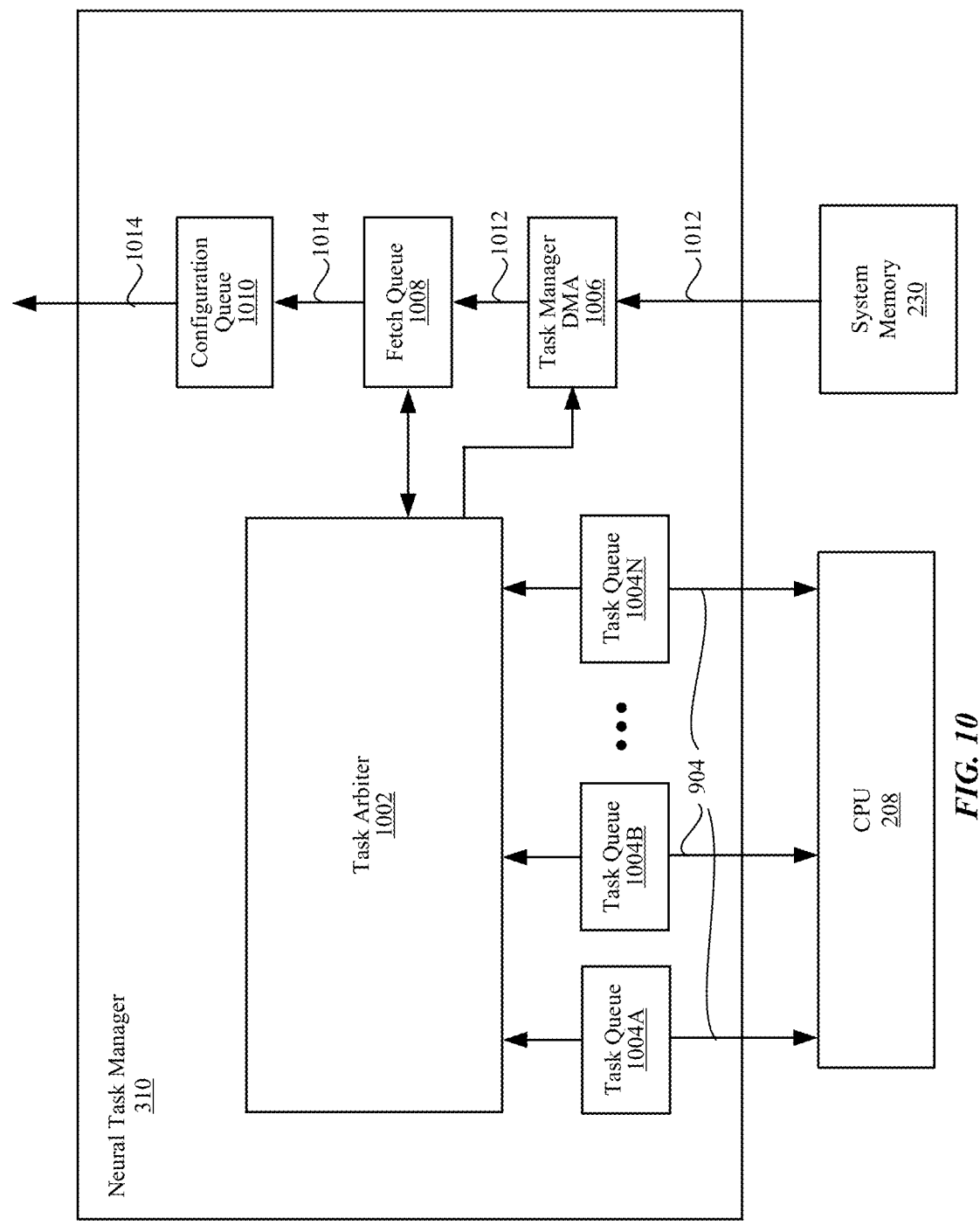
FIG. 10 is a block diagram of a neural task manager in the neural processor circuit, according to one embodiment.

FIG. 10 is a block diagram illustrating neural task manager 310, according to one embodiment. Neural task manager 310 manages the execution of tasks for one or more neural networks 700 by neural processor circuit 218. Neural task manager 310 may include, among other components, task arbiter 1002, task queues 1004A through 1004N (hereinafter collectively referred to as "task queues 1004" and individually also referred to as "task queue 1004"), task manager direct memory access (DMA) 1006, fetch queue 1008, and configuration queue 1010. Neural task manager 310 may include other components not illustrated in FIG. 10. For each task, neural task manager 310 may receive a task descriptor 1012 from a software compiling process. The task descriptor may define a configuration of neural processor circuit 218 to execute a corresponding neural engine task or a corresponding planar engine task. Neural task manager 310 transmits a version of the task descriptor 1012 (e.g., the task descriptor 1012 or data configuration 1014 extracted from the task descriptor 1012) to data processor circuit 318.

Task arbiter 1002 is a circuit or a combination of circuit and firmware that selects tasks from task queues 1004 for execution by neural processor circuit 218. Task arbiter 1002 dequeues tasks from task queues 1004, and places tasks in configuration queue 1010. While a task is in a configuration queue, it is committed to execution and the neural processor circuit performs a prefetch for input data and kernel data before the task is executed by other components of neural processor circuit 218. For example, task arbiter 1002 may perform priority arbitration between multiple task queues 1004, and dequeue tasks in the task queue 1004 with the highest priority.

Figure 11A:
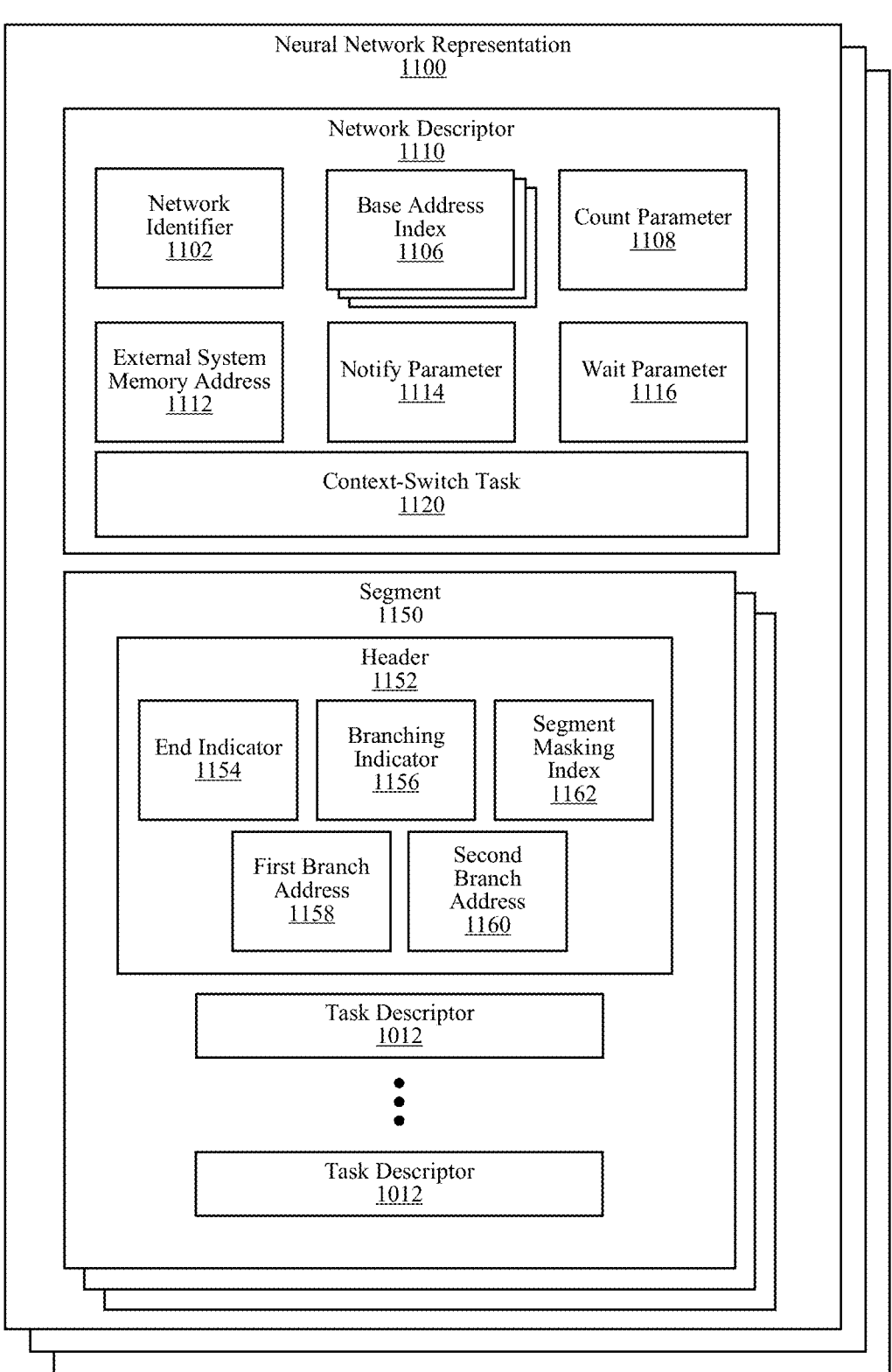
FIG. 11A is a block diagram illustrating one or more neural network representations, according to one embodiment.

Neural task manager 310 may include one or more task queues 1004. Each task queue 1004 is coupled to CPU 208 and task arbiter 1002. Each task queue 1004 may include first-in-first-out (FIFO) hardware for arranging network segments that may be stored in a memory location such as in system memory 230. An example configuration of network segments is shown in FIG. 11A as segments 1150. Each of segments 1150 may include a plurality of tasks. Each task may make reference to a task descriptor 1012. Task descriptor 1012 of a task specifies a configuration of neural processor circuit 218 for executing the task. Each task queue 1004 may be further associated with a priority parameter that defines the relative priority of task queues 1004.

Task manager DMA 1006 is coupled to task arbiter 1002, system memory 230, and fetch queue 1008. Task manager DMA 1006 includes a read circuit that receives task descriptors 1012 of tasks from a source (e.g., system memory 230) for storing task descriptors 1012 in fetch queue 1008. For example, task arbiter 1002 selects task queue 1004 according to the priorities of task queues 1004, and controls task manager DMA 1006 to select task descriptor 1012 of a task.

Fetch queue 1008 is a single-entry queue that stores task descriptor 1012 of a task that is pending to commit for execution. Fetch queue 1008 is coupled to task manager DMA 1006 to receive the task descriptor 1012 from the system memory 230. Fetch queue 1008 provides the task descriptor 1012 to configuration queue 1010, or configuration data 1014 extracted from task descriptor 1012 to configuration queue 1010.

Configuration queue 1010 holds configuration data 1014 of multiple tasks that have been committed for execution. When a task is in configuration queue 1010, kernel DMA 324 may fetch kernel data from system memory 230 to store in kernel extract circuit 432 of neural engines 314, and data processor DMA 320 may fetch input data from system memory 230 to store in buffer 334 of data processor circuit 318. To execute the task, kernel extract circuit 432 provides the prefetched kernel data to MAC 404 of neural engine 314, and data buffer 334 provides the prefetched input data to MAC 404 of neural engine 314. Planar engine 340 also accesses data processor circuit 318 to read its input data 342. In some embodiments, configuration queue 1010 may include multiple queues that hold configuration data 1014 extracted from the committed task descriptors 1012.

FIG. 11A is a block diagram illustrating one or more neural network representations 1100, according to an embodiment. Each neural network representation 1100 includes information, metadata, and tasks corresponding to a neural network. A neural network representation 1100 may be instantiated by CPU 208 for the neural processor circuit 218 to process. For example, a neural network representation 1100 may be generated when CPU 208 compiles a neural network or any machine learning model (for simplicity also referred to as a neural network for the purpose of discussion). CPU 208 determines the tasks need to be executed and save the tasks in the neural network representation 1100. Neural network representation 1100 may be stored in a memory (e.g., system memory 230 or memory in data processor circuit 318). At a given time, neural processor circuit 218 may perform computations related to more than one neural network. For example, device 100 may run multiple software applications that use neural networks for various purposes. As such, neural processor circuit 218 may access a plurality of neural network representations 1100 and may sometimes switch operations between various neural networks if neural task manager 310 determines one neural network should be prioritized over another.

Neural network representation 1100 may include a network descriptor 1110 and one or more segments 1130. Network descriptor 1110 may be stored in a contiguous region of memory that stores information related to a network-wide configuration along with an auxiliary task for a context switch, which may be referred to as context-switch task 1120. The memory that stores network descriptor 1110 may depend on embodiments. For example, in some embodiments, network descriptor 1110 is stored in system memory 230 while, in other embodiments, network descriptor 1110 is stored within neural processor circuit 218, such as in a memory location of data processor circuit 318 or task manager 310. In some embodiments, the information in network descriptor 1110 is fixed when CPU 208 compiles neural network representation 1100. In those embodiments, neural processor circuit 218 does not write to a network descriptor 1110.

Neural descriptor 1110 includes various fields that describe the network-wide setting of a neural network representation 1100 and specify data location for the neural network. For example, neural descriptor 1110 may include a network identifier (ID) 1102, one or more base address indexes 1106, a count parameter 1108, an external system memory address 1112, a notify parameter 1114, a wait parameter 1116, and a context-switch task 1120. Some of the data fields in network descriptor 1110 may be saved as bits that take the form of a data bit header. Other data fields may be saved as individual objects in a memory location. For example, in one embodiment, fields 1102, 1112, 1106, and 1108 are data bits that are included in the header of network descriptor 1110 and context-switch task 1120 takes the form of a task descriptor 1012, whose configuration is further discussed with reference to FIG. 12.

Various fields in network descriptors 1110 provide configuration information of a neural network representation 1100. For example, network ID 1102 may be a unique identifier that identifies a neural network. Network descriptor 1110 may include one or more base address indexes 1106. Each base address index 1106 is a pointer that represents base address register values for a segment 1150 associated with network descriptor 1110. A segment 1150 includes one or more tasks that are to be executed for the neural network. Count parameter 1108 records the number of base addresses associated with the neural network. For example, count parameter 1108 counts the number of base address indexes 1106 included in network descriptor 1110.

External system memory address 1112 is a pointer indicating the address of a backing storage location at system memory 230 for moving data between buffer 334 and system memory 230. Buffer 334 in data processor circuit 218 may be fast-access memory such as cache memory that is used for storing input and output data of neural engines 314 and planar engine 340 within neural processor circuit 218. Output data of one task may corresponding to an intermediate layer in a neural work and may be used as input for another layer. Buffer 334 has limited storage and may be used for storing data associated with a neural network. In some situations, neural processor circuit 218 may perform a context switch and transition its current operations from a first neural network to a second neural network even though the computation of the first neural network has not been completed. In such a case, data stored in buffer 334, which is currently associated with the first neural network, is placed at a location of system memory 230 for later retrieval when the computation associated with the first neural network is resumed. System memory 230, in this situation, may be referred to as an external system memory since the memory is outside of the neural processor circuit 218. External memory system address 1112 records the address of the location at the system memory 230 that stores the outgoing data from buffer 334. In some embodiments, each neural network representation 1100 may have a designated location at the system memory 230 to store any outgoing data from buffer 334. In those embodiments, external system memory address 1112 for each neural network representation 1100 is unique.

A context switch refers to a process for neural processor circuit 218 to switch from a first task (outgoing task) to a second task (incoming task) that is unrelated to the first task. A context switch is often associated with a switch of computations from a first neural network to a second neural network, although other types of switching (e.g., switching of task queues) may also be a context switch. During a context switch, data associated with the first neural network, particularly intermediate data stored in buffer 334, are swapped out to system memory 230 and data associated with the second neural network are swapped in from system memory 230.

Notify parameter 1114 and wait parameter 1116 are used to keep track of the currently run neural network and provides an indication of a context switch. Notify parameter 1114 may take the form of one or more bit values that allow software (e.g., a software application or the operating system) executed by CPU 208 to track the currently executing neural network. Notify parameter 1114 may cause neural task manager 310 to raise an interrupt when a network descriptor 1110 is parsed. Wait parameter 1116 may take the form of one or more bit values that are provided to allow the software to synchronously write data to system memory 230 and swap in data to buffer 334 for the incoming task. For example, wait parameter 1116 may be set to a stage indicating neural processor circuit 218 is in a context-switching stage. When wait parameter 1116 is set to such a stage, neural task manager 310 may pause and wait for software to acknowledge the context switch.

Context-switch task 1120 may take the form of a special task descriptor 1012. Context-switch task 1120 specifies the procedures for data processor circuit 318 to perform a context switch from handling an outgoing task to handling an incoming task. The outgoing task may be assigned to a first neural network while the incoming task may be assigned to a second neural network that is different from the first neural network. For example, upon queuing a context-switch task 1120, neural task manager 310 may send configuration data of context-switch task 1120 to data processor circuit 318 to cause data processor circuit 318 to transmit one or more neural engines 314 or planar engine's output corresponding to the outgoing task from buffer 334 to system memory 230. The configuration data of the context-switch task 1120 may also cause data processor circuit 318 to fetch data corresponding to the incoming task from system memory 230 to buffer 334.

A neural network representation 1100 also includes one or more segments 1150. Segment 1150 is a collection of tasks associated with a neural network. Segment 1150 may take the form of task-related data and may include one or more task descriptors 1012. In some embodiments, segment 1150 may include header 1152 and a sequence of tasks descriptor 1012.

Header 1152 stores data fields that are common to the tasks in a particular segment 1150. Header 1152 may include an end indicator 1154, a branching indicator 1156, a first branch address 1158, a second branch address 1160, and a segment masking index 1162. End indicator 1154 signifies whether a particular segment 1150 is the last segment of a neural network representation 1100.

Neural task manager 310 may support branching, which allows neural task manager 310 to selectively enqueue one of two or more branches of task queues subsequent to the current segment 1150. Neural task manager 310 may receive a branching command from data processor circuit 318. The branching command may be determined based on one or more values of outputs of a task in the current segment 1150. Based on the branching command, neural task manager 310 selects one of the branches to enqueue. Branching indicator 1156 signifies whether branching is enabled for the current segment 1150. If so, segment 1150 may also include first branch address 1158 and second branch address 1160, which are respectively the address of a first subsequent segment 1150 that represents a first branch and the address of a second subsequent segment 1150 that represents a second branch. The two branches may belong to the same neural network or different neural networks. Neural task manager 310 uses first branch address 1158 and second branch address 1160 to retrieve the selected segment branch to enqueue.

Segment masking index 1162 may also be referred to as a live-in value. Segment masking index 1162 provides masking information when segment 1150 is switched out in the middle of the segment when a context switch occurs. For example, segment 1150 includes more than one task and a context switch occurs after the completion of an intermediate task but not the final task. Segment masking index 1162 provides masking information when data is swapped out of buffer 334 during the context switch.

A segment 1150 also includes one or more task descriptors 1012, which are arranged in a particular order for neural task manager 310 to dequeue. Although task descriptors 1012 are arranged in order, in some embodiments, the tasks may be performed asynchronously, as discussed in FIGS. 8 and 9. In some embodiments, such as the configuration shown in FIG. 11A, a task descriptor 1012 may be stored within a segment 1150 as part of a block of memory location for storing data related to the particular segment 1150. In other embodiments (not shown), a segment 1150 may include pointers to various task descriptors 1012 that are stored separately from segment 1150. For example, task descriptors 1012 may be stored in system memory 230. In turn, segment 1150 stores a list of memory addresses that represent the list of task descriptors 1012.

Figure 11B:
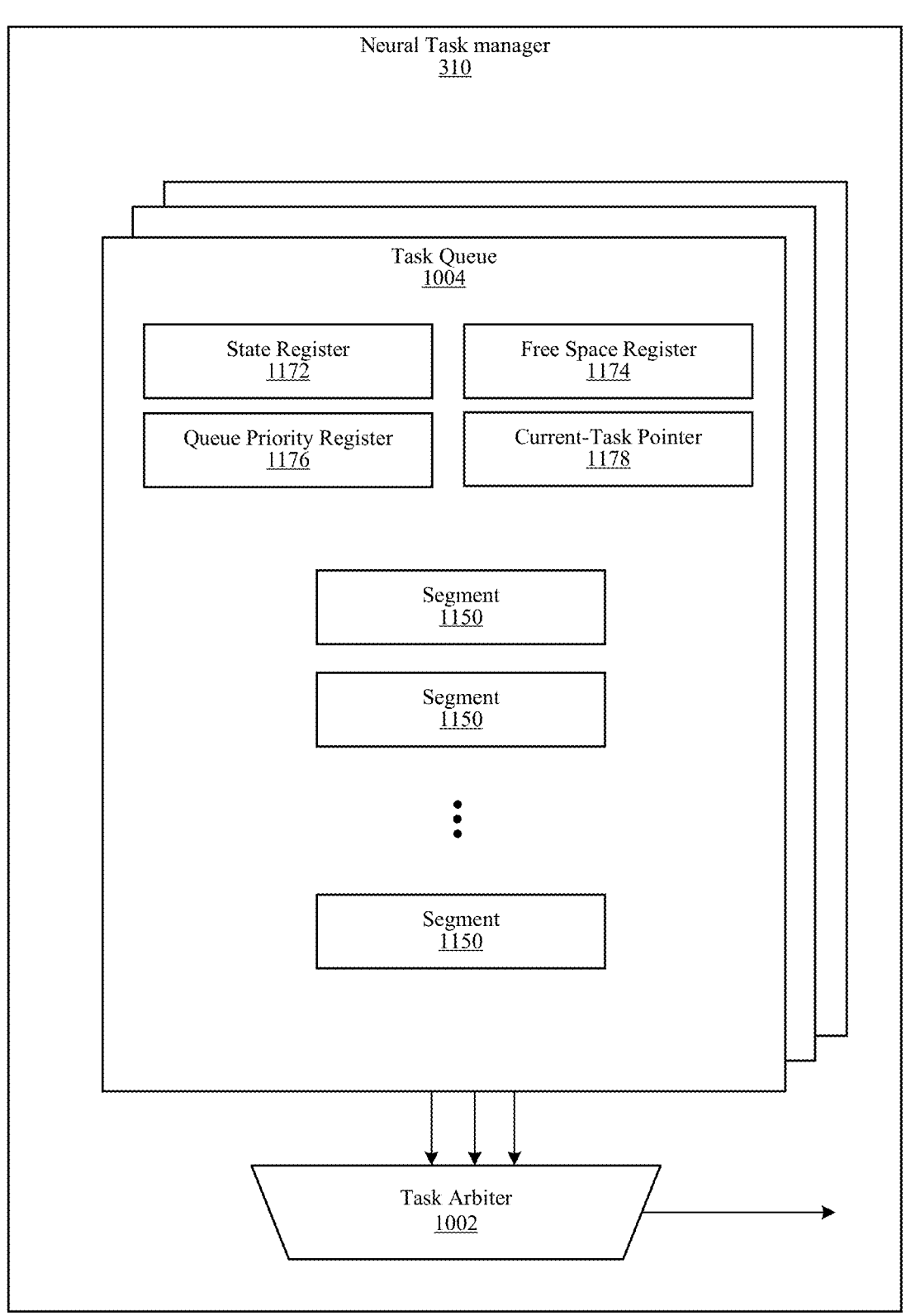
FIG. 11B is a block diagram illustrating one or more task queues, according to one embodiment.

FIG. 11B is a block diagram illustrating an example configuration of task queues 1004, according to an embodiment. FIG. 11B may correspond to part of a neural task manager 310 shown in FIG. 10 that shows task arbiter 1002 and a plurality of task queues 1004A through 1004N. Neural task manager 310 may include a predetermined number (e.g., 8) of separate task queues 1004. A task queue 1004 may be a hardware queue that includes memory slots (e.g., segment slots) for storing up to a predetermined number of segments 1150. Segments 1150 from one or more neural network representations 1100 may be enqueued in a task queue 1004 and dequeued (e.g., sent for execution) based on the priority of the task queue 1004 and the order of the segments 1150 within the task queue 1004.

A task queue 1004 may include one or more registers for storing values that represent the states and configuration of the task queue 1004. The registers may include a state register 1172, a free space register 1174, a queue priority register 1176, and one or more registers for a current-task pointer 1178. State register 1172 stores value(s) that represent the execution state of the queue. Free space register 1174 indicates the number of free slots in the hardware queue that are free. A slot may be occupied by a segment 1150 and may be free up when the tasks in the segment 1150 are dequeued for execution. Queue priority register 1176 stores a priority parameter for the task queue 1004. Task arbiter 1002 selects one of the plurality of task queues 1004 to be executed based on the priority parameter. After a task queue 1004 is selected, segments 1150 are executed in a first-in-first-out (FIFO) manner until the segments 1150 in the task queue 1004 are executed or until there is a context switch. Current-task pointer 1178 provides the memory address of the current task descriptor 1012 in the front most segment 1150.

In some embodiments, neural task manager 310 may support intra-queue context switch and inter-queue context switch. An intra-queue context switch occurs when there is a context switch within a task queue 1004. Put differently, neural task manager 310 executes a task queue 1004 and a context switch occurs between one segment to another segment within the same queue 1004. In an inter-queue context switch, a first task queue 1004 currently in execution is terminated and neural task manager 310 is switched to another queue.

For a task queue 1004 that involves an intra-queue context switch, segments 1150 from different neural network representations 1100 may be enqueued on the same task queue 1004, such as in an interleaved manner or in any suitable orders. Execution of segments 1150 within the task queue 1004 follows the segments' order. Neural task manager 310 inserts context-switch task 1120 between segments 1150 of different neural network representations 1100 on the same task queue 1004. The sharing of the same task queue with multiple neural networks allows software and compiler to time share a single priority level (with the same priority parameter) between multiple neural networks. As neural task manager 310 completes a first segment 1150 from a first neural network representation 1100, neural task manager 310 performs an intra-queue context switch to switch to a second segment 1150 from a second neural network representation 1100. If two successive segments 1150 of the same neural network representation 1100 are enqueued back-to-back, no context switch is inserted.

In some cases, an inter-queue context switch may occur when a segment 1150 has not been completed (e.g., tasks in the segments have not been completed dequeued.) Neural task manager 310 uses segment masking index 1162 to save the masking information for the particular segment 1150 before the context switch so that neural task manager 310 may return to that segment 1150 at a later time.

After neural task manager 310 completes a task queue 1004, neural task manager 310 may also perform an inter-queue context switch to dequeue another task queue 1004. The context switch may occur if the two consecutive task queues 1004 include task from different neural network representations 1100. For example, the last task in the first task queue 1004 may be assigned to a first neural network and the first task in the second task queue 1004 may be assigned to a second neural network. In some cases, a context switch does not need to occur in a transition between two queues. For example, the first task in the subsequent task queue 1004 may simply be a continuation of the last task in the previous queue.

The values in state register 1172 may signify various execution states of a task queue 1004 that are related to context switch. In one embodiment, a task queue 1004 may be in one of four states. In an enabled state, the task queue 1004 participates in task arbitration and executes tasks as normal. In a stopped state, the task queue 1004 participates in the arbitration, but does not execute tasks. If the task queue 1004 becomes the current queue, neural task manager 310 performs a context switch and stop executing any task in the stopped task queue 1004. In a suspended state, the task queue 1004 does not participate in the arbitration. At the next context switch point, a new queue will be selected by the arbitration. In the event where there are no other queues, the suspended task queue 1004 remains the current queue. In a disabled state, the task queue 1004 does not participate in the arbitration. At the next context switch point, a new queue will be selected by the arbitration. In the event where there are no other queues, the disabled task queue 1004 is context switched out to an idle state. This results in a spill of buffer 334 to system memory 230, without a corresponding fill of data into buffer 334. The context-switch task 1120 comes from network descriptor 1110 of the current queue from the most recent segment 1150.

Figure 12:
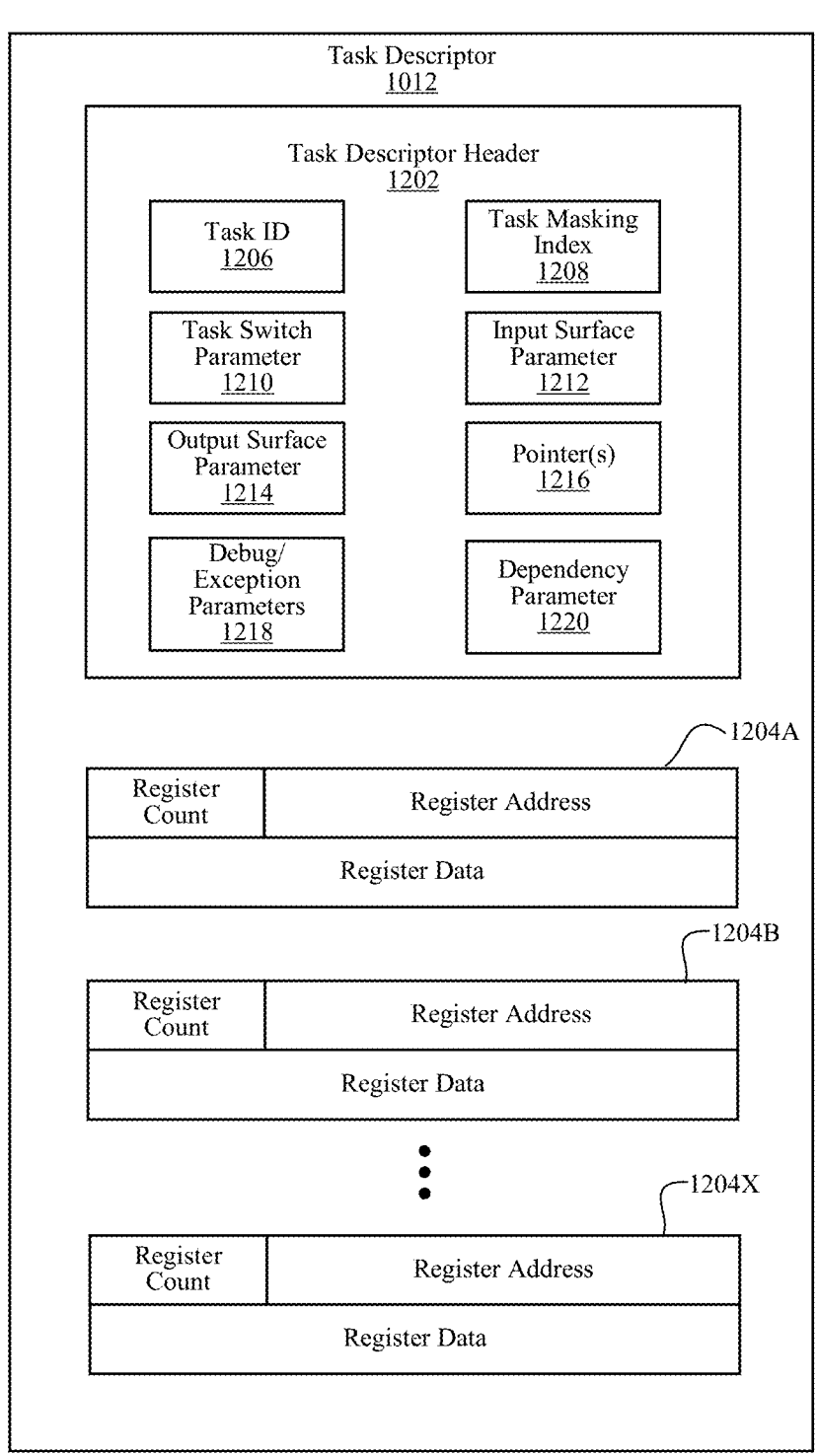
FIG. 12 is a block diagram illustrating a task descriptor, according to one embodiment.

FIG. 12 is a diagram illustrating task descriptor 1012, according to one embodiment. Upon a selection of a task queue 1004, tasks in a segment 1150 are dequeued and sent to execution in order. By way of example, task arbiter 1002 places task descriptor 1012 in fetch queue 1008 from system memory 230, which is then transferred to configuration queue 1010. The highest priority (e.g., first in) task descriptor 1012 in configuration queue 1010 is used to configure neural processor circuit 218 for execution during the configuration period. Configuration data 1014 of task descriptor 1012 includes task descriptor header 1202 and address data 1204A through 1204X (hereinafter referred to as "address data 1204").

Task descriptor header 1202 configures various operations of neural task manager 310 related to the particular task descriptor 1012, including operations related to task selection, context switching, task switching, and data dependency. Task descriptor header 1202 may be parsed by task arbiter 1002 to extract configuration data 1014 that programs neural task manager 310 and other components of the neural processing circuit 218.

Task descriptor header 1202 may include task identifier (ID) 1206 that identifies the task, task masking index 1208 that defines masking information when data is swapped out of buffer 334 during context switch, task switch parameter 1210 defining whether the neural task manager 310 should initiate a task switch (e.g., at the end of a segment 1150) after the execution of the task, input surface parameter 1212 defining whether the input data for the task should be retrieved from system memory 230 or data processor circuit 318, output surface parameter 1214 defining whether the output data of the task should be stored in system memory 230 or data processor circuit 318, various (e.g., base address) pointers 1216 to facilitate the programming of neural processor circuit 218, one or more debug/exception parameters 1218 that control event, exception, or debug logging, and dependency parameter 1220 that defines whether the particular task is dependent on a previous task.

Task masking index 1208 provides masking information when data is swapped out of buffer 334 or swapped into buffer 334 during a context switch. Task masking index 1208 may also be referred to as a live-out value. During computations related to an outgoing task, not every memory location in buffer 334 needs to always be occupied by data that are useful for computations of the outgoing task or subsequent tasks related to the outgoing tasks. Task masking index 1208 provides masking information indicating data in which part of buffer 334 needs to be swapped in or out. For example, task masking index 1208 may be a multi-bit value with each bit corresponding to a region in buffer 334. A bit value of "1," or vice versa, may represent the region corresponding to the bit that needs to be swapped in or out.

Each instance of address data 1204A through 1204N (collectively or individually referred to as "address data 1204") defines an address and data payload pair used to program the components of the neural processor circuit 218. The data payload may include input data and kernel data used to execute the task. For example, each instance of address data 1204 includes register data defining the data payload, a register address defining a destination memory location of neural processing circuit 218 for receiving the register data, and a register count defining a number of consecutive memory locations (e.g., registers) to be written with the register data. In some embodiments, the register address is combined with the base address index 1106 stored in network descriptor 1110 to define the full address of each memory location. If task descriptor 1012 is generated at compile time, then the actual run time addresses may not be known. Base address index 1106 is used to avoid duplicating or updating all task descriptors with dynamically assigned addresses.

In one or more embodiments, base address index 1106 is used for programming data processor circuit 318. Base address index 1106 includes data dependency information. Data dependency information is included as part of configuration data 1014 sent to data processor circuit 318.

Example Context-Switch Task

Figure 13:
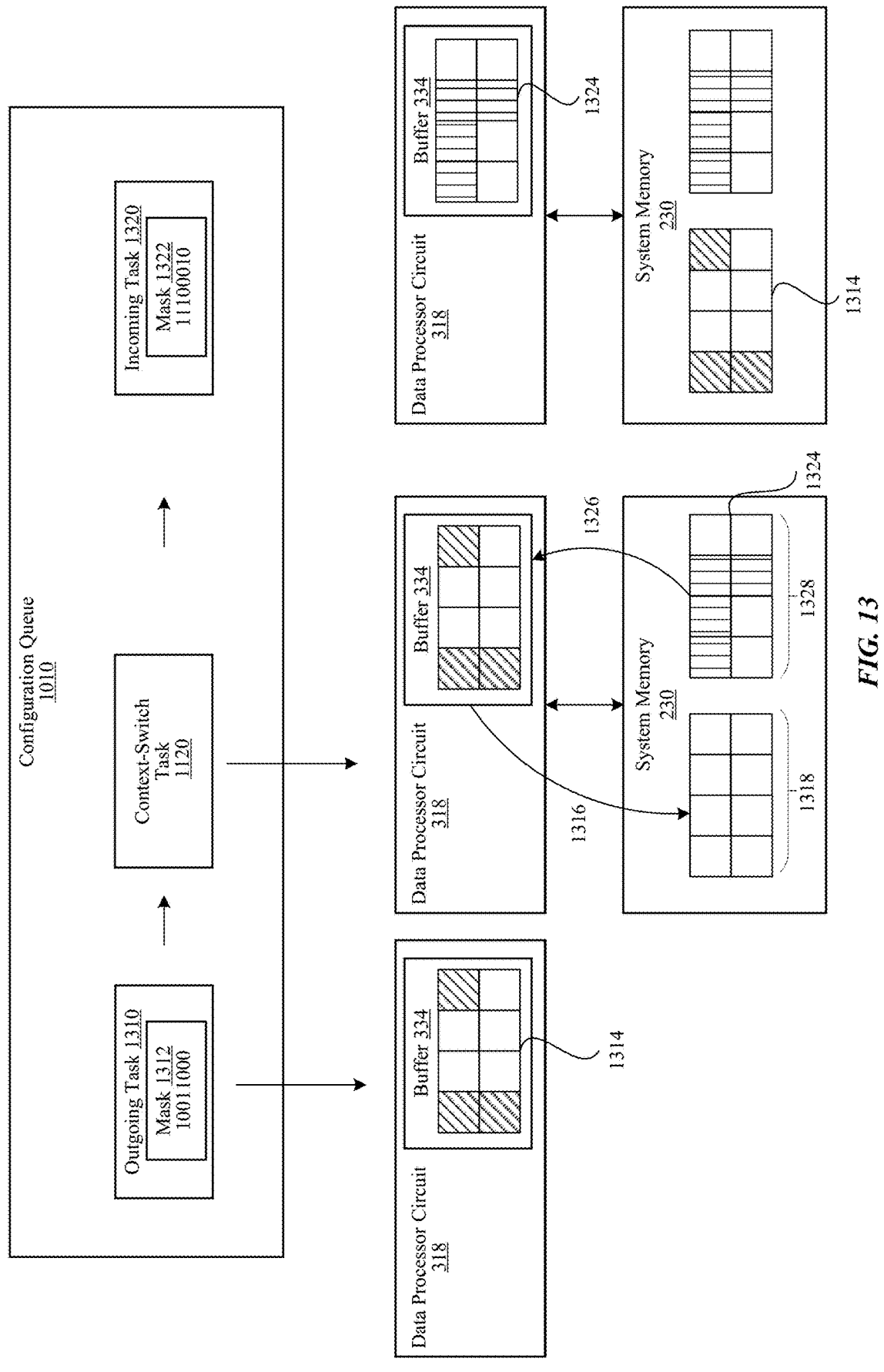
FIG. 13 is a block diagram illustrating a context switch process, according to one embodiment.

FIG. 13 is a conceptual diagram illustrating the operation of neural processor circuit 218 for a context switch, according to an embodiment. FIG. 13 illustrates a transition between an outgoing task 1310 and an incoming task 1320 by using a context-switch 1120. Outgoing task 1310 and incoming task 1320 may each be a task that is included a segment 1150 in a task queue 1004. Outgoing task 1310 and incoming task 1320 may be assigned to the same task queue 1004 in the case of an intra-queue context switch and may be assigned to different task queues 1004 in the case of an inter-queue context switch.

When neural task manager 310 processes various tasks a task queue 1004, it dequeues one or more tasks for execution. After a task is dequeued and committed, neural task manager 310 may detect that the next task to be dequeued is for computation of data in a different context from the previous task. Data are in different contexts when neural processor circuit 218 need to swap data that are stored inside neural processor circuit 218 for computation. For example, two tasks may be in different contexts when the two tasks are assigned to different neural networks. If neural task manager 310 detects that context switching is required for two tasks, such as based on network IDs 1102 in network descriptors 1110 associated with the two tasks, neural task manager 310 fetch a context-switch task 1120 from network descriptor 1110 associated with the neural network representation 1100 that includes the first task. Neural task manager 310 dequeues and commits context-switch task 1120 before committing the second task. Configuration data of the first task, the context-switch task 1120, and the second task are fetched and put into configuration queue 1010, as illustrated in FIG. 13. The first task and the second task may respectively be referred to as outgoing task 1310 and incoming task 1320. As part of the configuration data, outgoing task 1310 and incoming task 1320 may include their own mask 1312 and 1322, which are examples of task masking indexes 1208.

Outgoing task 1310 and incoming task 1320 may be any suitable tasks such as a neural engine task or a planar engine task. For example, one or both tasks may be neural engine tasks that direct neural engines 314 to perform convolution operations on input data corresponding to the tasks to generate output data. The output data may be represented as output data 1314 that is stored in buffer 334. Output data 1314 may be intermediate output for an intermediate layer of a neural network. The intermediate output is used as input for another layer of the neural network.

Upon completion of outgoing task 1310, neural task manager 310 may transmit configuration data of context-switch task 1120 to data processor circuit 318 to carry out a context switch. The configuration data causes data processor circuit 318 to transmit 1316 the output data 1314 corresponding to the outgoing task 1310 from buffer 334 to system memory 230. System memory 230 may be external to neural processor circuit 218 and may be referred to as external system memory. The transmission 1316 of data from buffer 334 to external system memory 230 may be referred to as spilling. The configuration data of context-switch task 1120 also causes data processor circuit 318 to fetch 1326 data 1324 corresponding to incoming task 1320 from the external system memory 230 to buffer 334. The fetching 1326 of data from system memory 230 to buffer 334 may be referred to as filling. The spilling and filling swap the data of two tasks so that buffer 334 now stores data 1324 of incoming task 1320 and neural processor circuit 218 is ready for computation related to incoming task 1320.

After context switching, neural processor circuit 218, with buffer 334 storing data 1324, performs operations specified in incoming task 1320. Data 1314 associated with outgoing task 1310 is stored outside of neural processor circuit 218 until a future context switch is performed to swap data 1314 back into buffer 334 to continue tasks related to the outgoing task 1310.

In some embodiments, system memory 230 may include reserved locations for tasks that are assigned to different neural networks. For example, output data 1314 corresponding to outgoing task 1310 is transmitted to a first external system memory location 1318 and data 1324 corresponding to incoming task 1320 is fetched from a second external system memory location 1328. The first external system memory location 1318 and second external system memory location 1328 may each be reserved for a neural network. For example, the first address of first external system memory location 1318 may be stored in a first external system memory address 1112 in a first network descriptor 1110 of a first neural network representation 1100 to which outgoing task 1310 is assigned. The second address of second external system memory location 1328 may be stored in a second external system memory address 1112 in a second network descriptor 1110 of a second neural network representation 1100 to which incoming task 1320 is assigned.

In some embodiments, a task may be associated with a mask that specifies which fields of buffer 334 should be spilled or filled. In some cases, a task may generate a result that does not occupy the entire buffer 334 or only a certain portion of data in buffer 334 is useful to be saved in a context switch. In such situations, a mask, which may be stored as task masking index 1208, may be used to indicate what regions of buffer 334 that may be spilled or filled.

The mask may take any suitable form to indicate what data stored in buffer 334 needs to be spilled or filled. In one embodiment, buffer 334 may be divided into N fields and the mask may be an N-bit string with each bit corresponding to a field. For example, in FIG. 13, buffer 334 is illustrated as having 8 fields (e.g., regions in buffer 334), each represented by a square. The number N, in other embodiments, may be other suitable numbers, such as 32, 64, or an arbitrary number. The fields in buffer 334 may be divided equally with fixed length or may be divided in any suitable manner.

By way of example, outgoing task 1310 is associated with mask 1312 with the value 10011000. "1" represents a field that needs to be saved and "0" represents a field that does not need to be saved. As shown in FIG. 13, only the first, fourth, and fifth fields (represented by shaded squares) are spilled to system memory 230 at location 1318. Likewise, incoming task 1320 is associated with mask 1322 with the value 11100010. The first, second, third, and seventh fields (also shaded in FIG. 13) are filled from system memory 230 to buffer 334.

Example Process for Context-Switching

FIG. 14 is a flowchart depicting an example process for performing context switch operations in a neural processor circuit 218, according to an embodiment. The process may be cooperatively performed by various components of neural processor circuit 218. A context switch may occur, for example, when neural processor circuit 218 pause computations associated with a first neural network and transition to performing computations with a second neural network.

Neural processor circuit 218 performs 1410, by one or more neural engine circuits 314, convolution operations on input data corresponding to one or more tasks to generate output data. The convolution operations may correspond to operations in one or more convolutional layers in a CNN. The convolution operations may also correspond to operations in other types of machine learning models.

Neural processor circuit 218 stores 1420, by buffer 334 of data processor circuit 318 that is coupled to an external system memory 230, the output data from the one or more neural engine circuits 314. For example, output data may be stored in buffer 334 for fast access for computations in subsequent operating cycles of the same task or for computations in subsequent tasks.

Neural processor circuit 218 receives 1430, by a task manager circuit, such as neural task manager 310, a context-switch task 1120. The context-switch task 1120 may specify a switch of data processor circuit 318 from handling an outgoing task 1310 to an incoming task 1320. In some cases, a context switch occurs when neural task manager 310 determines that computations of another neural network need to be prioritized over the current neural network. In some cases, the priority command may be transmitted from CPU 208. In another example, CPU 208 may specify that computations related to two different neural networks are equally important and assign the same priority level to the tasks of those two neural networks. The neural networks may be processed together in an interleaved manner. In such a situation, intra-queue context switching may occur between the two neural networks.

In some cases, incoming task 1320 may be assigned to a neural network that is previously paused. For example, incoming task 1320 may be an intermediate task of a neural network having computation previously paused by the neural processor circuit 218. The context-switch task 1120 resumes the computation of that neural network.

Neural processor circuit 218 transmits 1440 configuration data of context-switch task 1120 to data processor circuit 318 to cause data processor circuit 318 to transmit the output data corresponding to the outgoing task 1310 from buffer 334 to external system memory 230. The configuration of context-switch task 1120 also causes data processor circuit 318 to fetch data corresponding to incoming task 1320 from the external system memory 230 to buffer 334. The transmission of data may be specified by one or more masks, which indicate the fields in buffer 334 that may need to be spilled or filled. Subsequent tasks belong to the same neural network of outgoing task 1310 may be later resumed in another context switch.

A context switch may occur as an inter-queue context switch or an intra-queue context switch. In an inter-queue context switch, neural task manager 310 dequeues tasks in a first task queue 1004 and switches to dequeuing tasks in a second task queue 1004. An inter-queue context switch may occur when neural task manager 310 has completely dequeuing the tasks in the first task queue 1004. In an intra-queue context switch, two segments 1150 assigned to the same task queue 1004 may correspond to different contexts such as different neural networks. The neural networks may be assigned to the same level of priority. Context switch may occur in the middle of a segment 1150 without completing the tasks in the segment 1150. Neural task manager 310 may consult segment masking index 1162 to determine where to resume the segment 1150 associated with incoming task 1320 after the segment 1150 is swapped out in the context switch.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A task manager circuit, comprising:
   a first task queue;
   a second task queue; and
   a controller coupled to the first task queue and the second task queue and configured to:
   receive a context-switch task specifying a switch for a data processor circuit from handling a first task to a second task, wherein the first task or the second task is stored in the first task queue or the second task queue; and
   transmit configuration data of the context-switch task to the data processor circuit to cause the data processor circuit to:
   transmit output data corresponding to the first task generated by a neural engine circuit of a plurality of neural engine circuits to an external system memory that is shared by the plurality of neural engine circuits; and
   fetch data corresponding to the second task from the external system memory to a buffer of the data processor circuit.

2. The task manager circuit of claim 1, wherein the first task is assigned to a first neural network and the second task is assigned to a second neural network that is different from the first neural network.

3. The task manager circuit of claim 1, wherein the first task queue comprises a hardware queue that comprises memory slots configured to store a predetermined number of segments including one or more task descriptors.

4. The task manager circuit of claim 1, wherein the first task queue comprises one or more registers configured to store values that represent states and a configuration of the first task queue.

5. The task manager circuit of claim 1, wherein the first task queue comprises a free space register configured to indicate a number of free slots in the first task queue that are free to store one or more segments including one or more task descriptors.

6. The task manager circuit of claim 1, wherein the first task queue comprises a state register configured to store a state selected from an enabled state, a stopped state, a suspended state, and a disabled state.

7. The task manager circuit of claim 1, wherein the first task queue comprises a queue priority register configured to store a priority parameter for the first task queue.

8. The task manager circuit of claim 1, wherein the first task queue has a first priority and the second task queue has a second priority higher than the first priority.

9. The task manager circuit of claim 1, wherein the first task is configured to be stored in a first segment of the first task queue, the second task is configured to be stored in a second segment of the first task queue, and the context-switch task is configured to be stored between the first segment and the second segment.

10. The task manager circuit of claim 1, wherein the first task is configured to be stored in the first task queue and the second task is configured to be stored in the second task queue different from the first task queue.

11. A method of performing neural processing operations, comprising:

receiving, by a task manager circuit, a context-switch task specifying a switch for a data processor circuit from handling a first task to a second task, wherein the first task or the second task is stored in a first task queue or a second task queue;

transmitting configuration data of the context-switch task to the data processor circuit;

transmitting, by the data processor circuit, output data corresponding to the first task generated by a neural engine circuit of a plurality of neural engine circuits to an external system memory that is shared by the plurality of neural engine circuits; and fetching data corresponding to the second task from the external system memory to a buffer of the data processor circuit.

12. The method of claim 11, further comprising:

assigning the first task to a first neural network; and assigning the second task to a second neural network that is different from the first neural network.

13. The method of claim 11, wherein the first task queue comprises a hardware queue that comprises memory slots to store a predetermined number of segments including one or more task descriptors.

14. A neural processor circuit, comprising:

one or more neural engine circuits configured to perform convolution operations on input data corresponding to one or more tasks to generate output data;

a data processor circuit coupled to the one or more neural engine circuits and coupled to a system memory, the data processor circuit comprising a buffer configured to store the output data from the one or more neural engine circuits; and a task manager circuit comprising a first task queue, a second task queue, and a controller coupled to the first task queue and the second task queue and configured to:

receive a context-switch task specifying a switch for the data processor circuit from handling a first task to a second task, wherein the first task or the second task is stored in a first task queue or a second task queue; and transmit configuration data of the context-switch task to the data processor circuit to cause the data processor circuit to:

transmit output data corresponding to the first task generated by the one or more neural engine circuits and stored in a buffer of the data processor circuit to an external system memory that is shared by a plurality of neural engine circuits; and fetch data corresponding to the second task from the external system memory to the buffer.

15. The neural processor circuit of claim 14, wherein the first task queue comprises a hardware queue that comprises memory slots configured to store a predetermined number of segments including one or more task descriptors.

16. The neural processor circuit of claim 14, wherein the first task queue comprises one or more registers configured to store values that represent states and configuration of the first task queue.

17. The neural processor circuit of claim 14, wherein the first task queue comprises a free space register configured to indicate a number of free slots in the first task queue that are free to store one or more segments including one or more task descriptors.

18. The neural processor circuit of claim 14, wherein the first task queue comprises a state register configured to store a state selected from an enabled state, a stopped state, a suspended state, and a disabled state; and wherein the first task queue comprises a queue priority register configured to store a priority parameter for the first task queue.

19. The neural processor circuit of claim 14, wherein the first task is configured to be stored in a first segment of the first task queue, the second task is configured to be stored in a second segment of the first task queue, and the context-switch task is configured to be stored between the first segment and the second segment.

20. The neural processor circuit of claim 14, wherein the first task is configured to be stored in the first task queue and the second task is configured to be stored in the second task queue different from the first task queue.

\*　\*　\*　\*　\*